(12) United States Patent  
Motherway et al.

(10) Patent No.: US 6,578,929 B2
(45) Date of Patent: Jun. 17, 2003

(54) TUFTING ORAL BRUSHES

(75) Inventors: William Motherway, Boston, MA (US); Joseph Depuydt, Quincy, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/863,193

(22) Filed: May 23, 2001

(65) Prior Publication Data

US 2002/0175556 A1 Nov. 28, 2002

(51) Int. Cl.[7] .................................................. A46D 3/04
(52) U.S. Cl. ............................................... 300/2; 300/21
(58) Field of Search ............................ 300/2–8, 21, 9; 264/243

(56) References Cited

U.S. PATENT DOCUMENTS

| 1,355,278 | A |   | 10/1920 | Sherman |  |
|---|---|---|---|---|---|
| 2,710,774 | A |   | 6/1955 | Baumgartner | 300/4 |
| 3,408,112 | A |   | 10/1968 | Pitrowski | 300/21 |
| 4,132,449 | A |   | 1/1979 | Bergman | 300/4 |
| 4,171,850 | A | * | 10/1979 | Eriksson | 300/2 |
| 4,635,313 | A |   | 1/1987 | Fassler et al. | 15/193 |
| 4,637,660 | A |   | 1/1987 | Weihrauch | 300/21 |
| 4,807,938 | A |   | 2/1989 | Weihrauch | 300/21 |
| 4,979,782 | A |   | 12/1990 | Weihrauch | 300/4 |
| 5,143,424 | A |   | 9/1992 | Boucherie | 300/2 |
| 5,344,218 | A |   | 9/1994 | Weihrauch | 300/2 |
| 5,390,984 | A |   | 2/1995 | Boucherie et al. | 300/21 |
| 5,431,484 | A |   | 7/1995 | Zahoransky et al. | 300/2 |
| 5,458,331 | A | * | 10/1995 | Bothwell | 473/534 |
| 5,458,400 | A |   | 10/1995 | Meyer | 300/21 |
| 5,474,366 | A | * | 12/1995 | Strutt et al. | 300/21 |
| 5,533,791 | A |   | 7/1996 | Boucherie | 300/4 |
| 5,622,411 | A |   | 4/1997 | Weihrauch | 300/21 |

FOREIGN PATENT DOCUMENTS

| DE | 29712554 | 11/1998 | A46D/3/00 |
|---|---|---|---|
| WO | 0156766 | 9/2001 | B29C/45/14 |

* cited by examiner

Primary Examiner—Robert J. Warden, Sr.
Assistant Examiner—Shay L Balsis
(74) Attorney, Agent, or Firm—Fish & Richardson P.C.

(57) ABSTRACT

Methods and devices are provided for tufting oral brushes. The methods include inserting free ends of continuous strands of filaments into blind holes in a moldbar, at least some of the blind holes having different depths and/or extending at different angles.

20 Claims, 22 Drawing Sheets

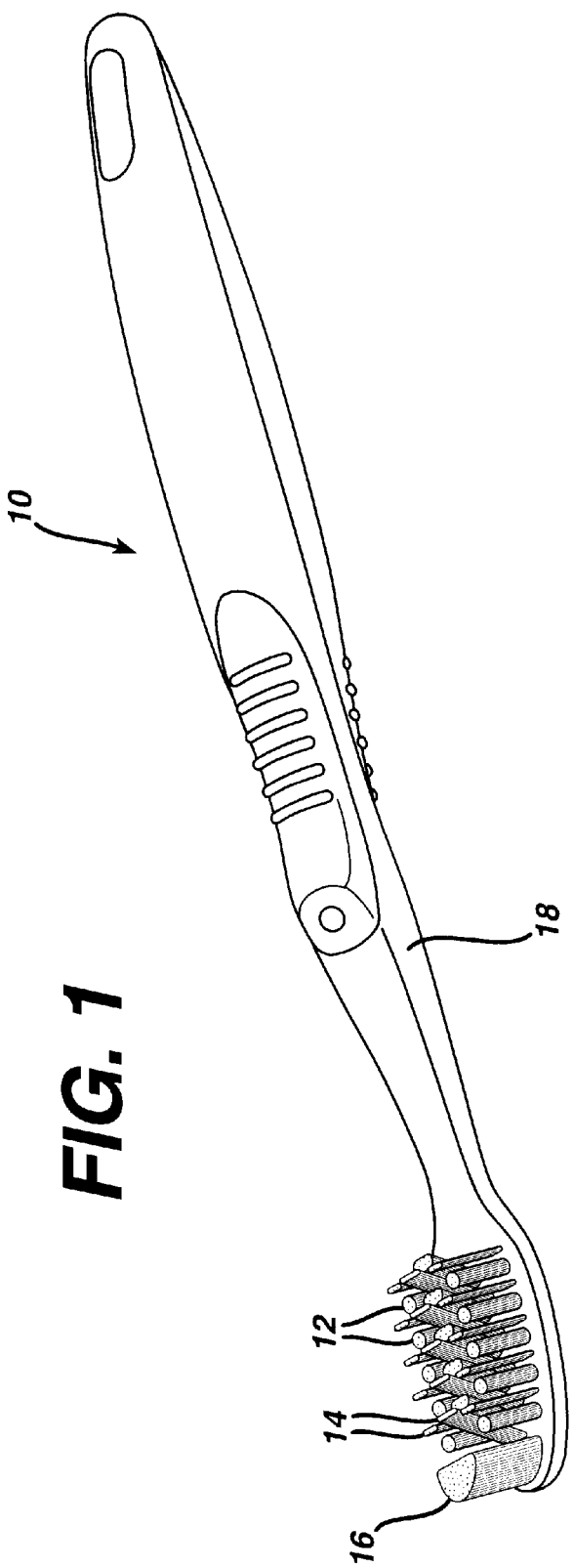

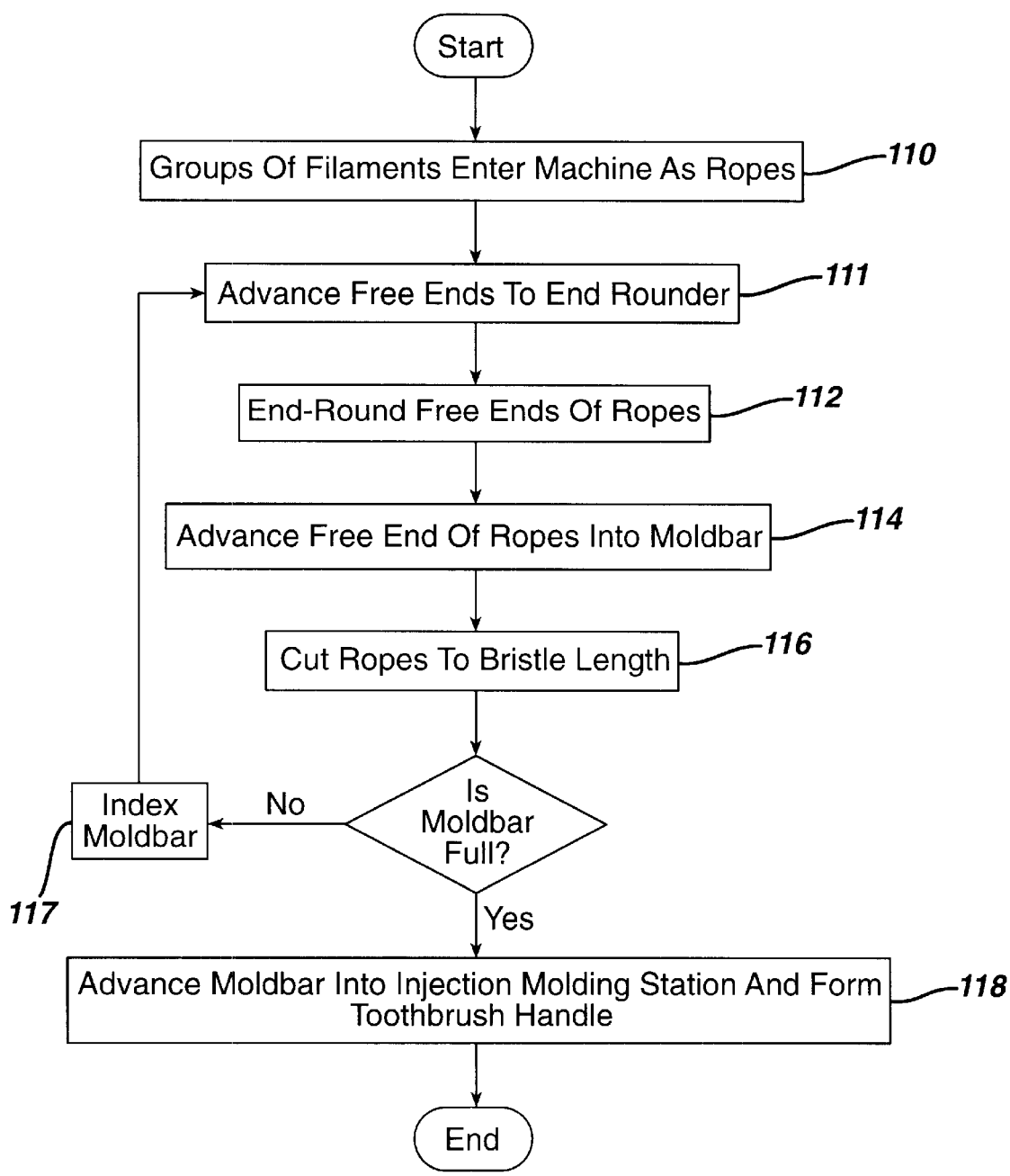

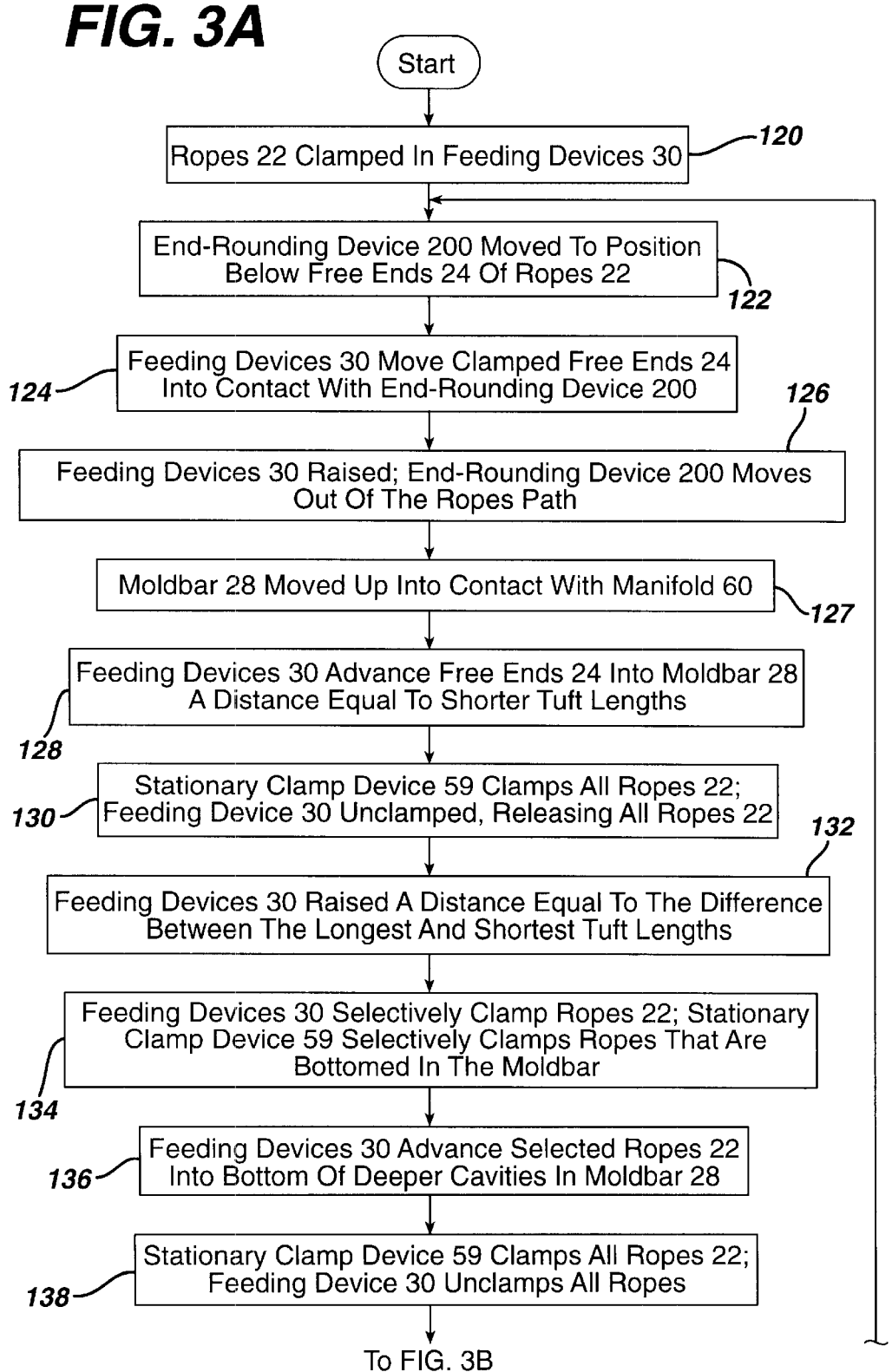

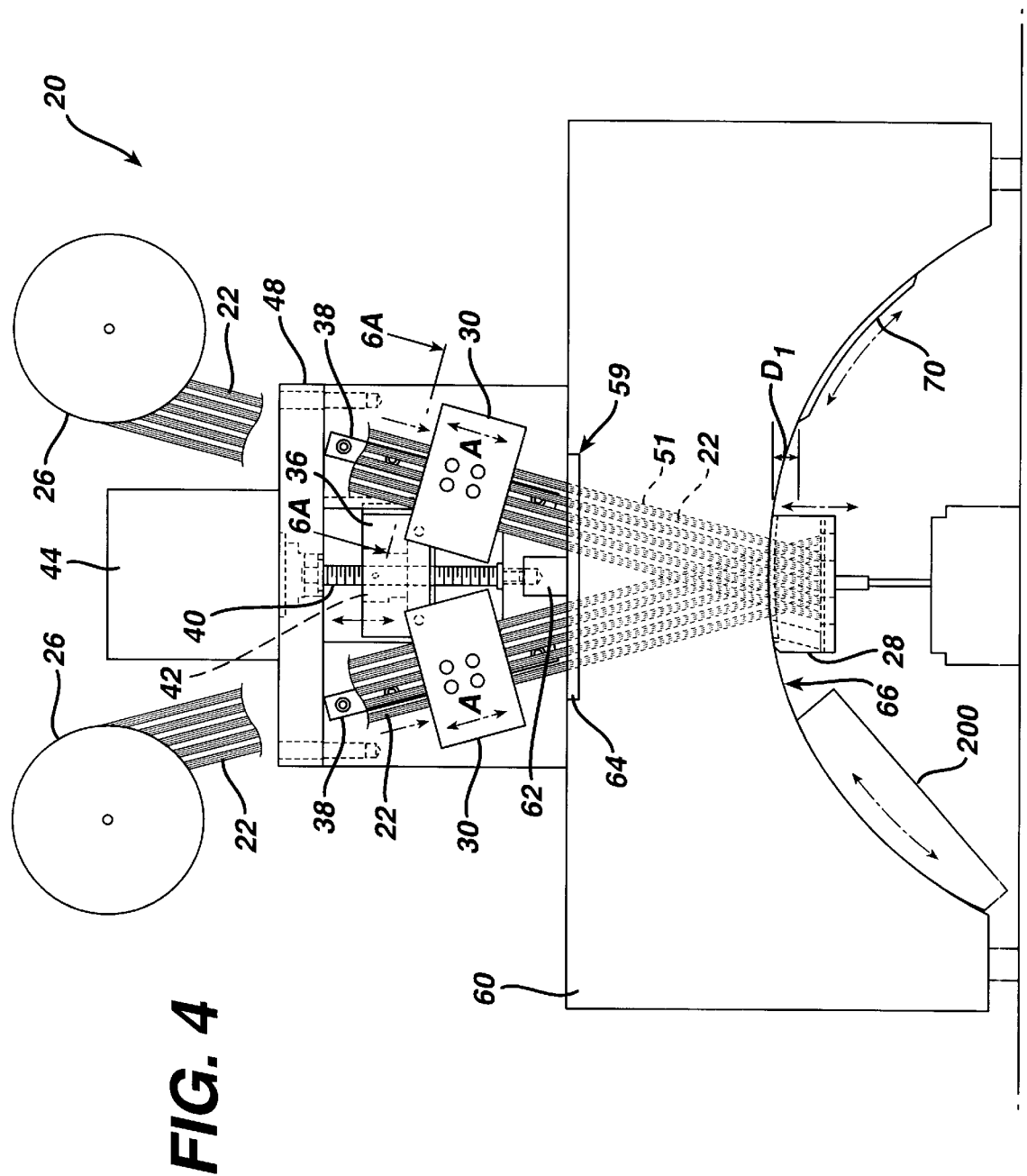

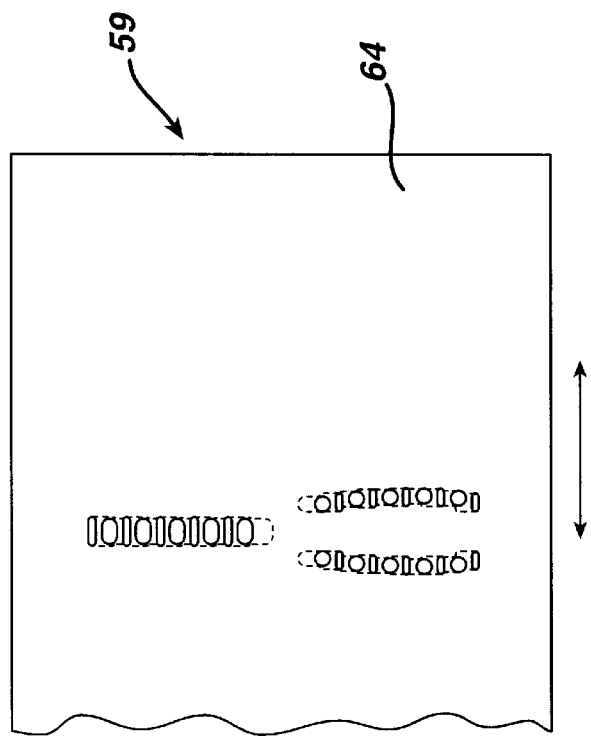
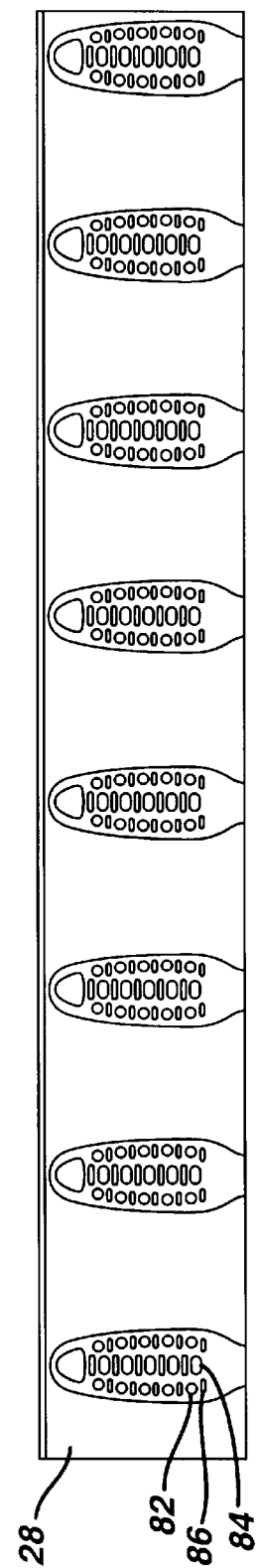

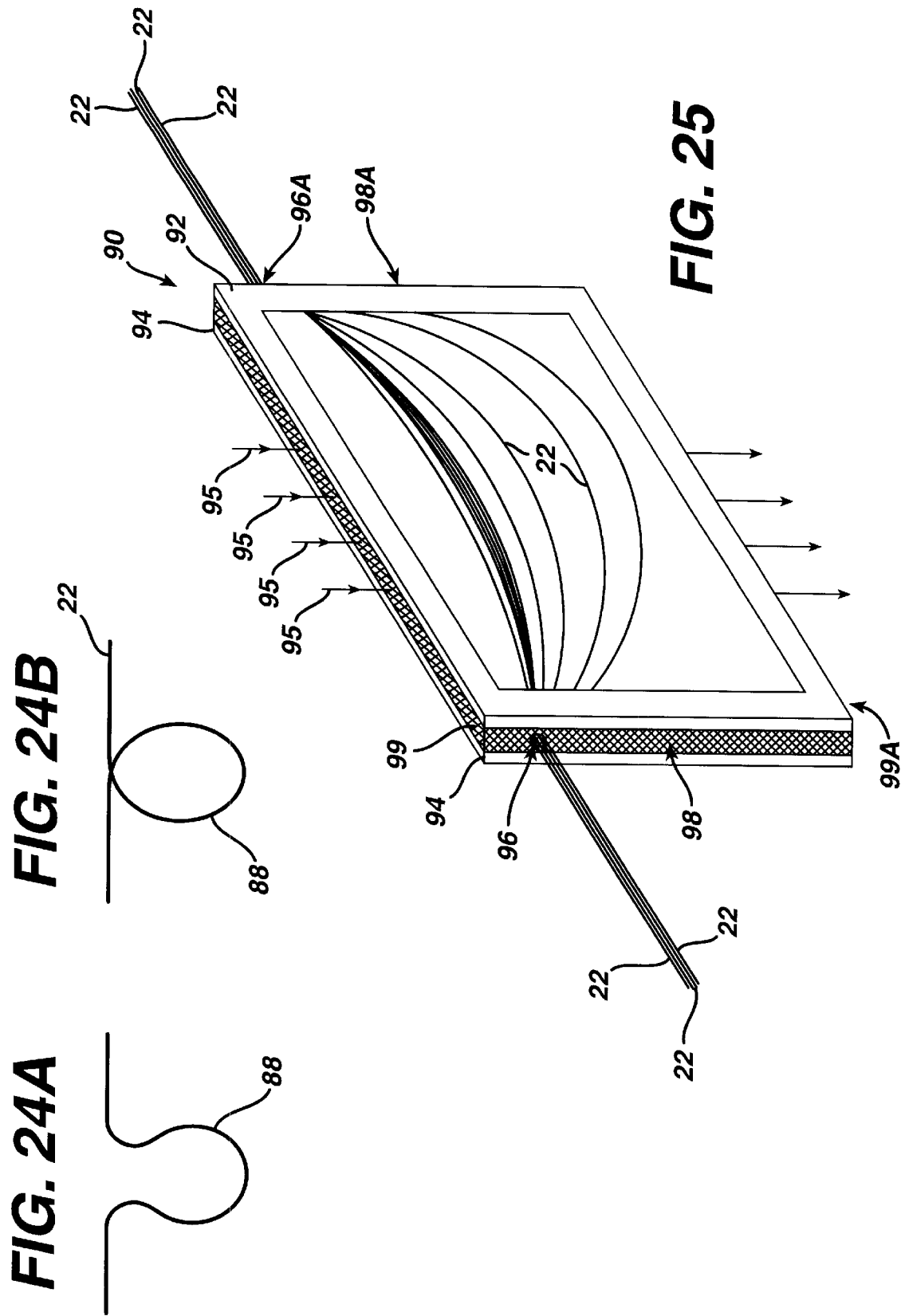

TUFTING ORAL BRUSHES

TECHNICAL FIELD

This invention relates to methods and devices for tufting oral brushes.

BACKGROUND

Conventional toothbrushes generally include tufts of bristles mounted on the head of an oral brush handle. Until recently, the bristles were generally mounted perpendicular to the top surface of the head of the brush, and the tufts were of the same length. Methods and devices for mounting bristles in this orientation are well known.

Recently, the oral care industry has recognized the benefits of toothbrushes having tufts of varying lengths and/or tufts extending at different angles relative to the head of the toothbrush. A toothbrush having tufts extending at different angles is shown in FIG. 1.

One method of manufacturing toothbrushes involves placing tufts of finished (end-rounded) bristles so that their unfinished ends extend into a mold cavity, and forming the toothbrush body around the unfinished ends of the tufts by injection molding, thereby anchoring the tufts in the toothbrush body. The tufts are held in the mold cavity by a mold bar having blind holes that correspond to the desired positioning of the tufts on the finished brush. The finished bristles may be formed by a process that includes unwinding a rope of filaments from a spool, end-rounding the free end of the filaments, cutting off a portion of the rope that is adjacent the free end of the filaments to form bristles having the desired length, and placing the bristles into a rectangular box, called a magazine. Tufts are then formed by picking groups of bristles from the magazine.

The bristles are tamped as they are put into the magazine, in an effort to obtain height uniformity among the thousands of bristles that can eventually occupy a magazine. However, height irregularities tend to occur, which may result in unacceptable flaws in the finished toothbrush. For example, if a single bristle protrudes from the magazine when it is picked from the magazine and inserted into the mold bar, the protruding bristle may protrude from the back of the finished toothbrush.

Problems may also occur when the bristles are picked from the magazine and transferred to the machine that fills the moldbar. A picker device attempts to repeatedly choose the proper number of bristles to form a tuft. However, the inherent difficulty in this task may result in tufts of bristles that are either too small or too large for the blind holes in the moldbar. If a tuft is too small, the blind hole is not sufficiently filled and plastic will flow into the hole when the handle is formed. If a tuft is too large, one or several bristles may not enter the moldbar, but rather curl to the side and prevent the complete insertion of the tuft into the moldbar, which may then interfere with molding.

The problems inherent in transferring pre-cut tufts from a magazine to a moldbar are generally exacerbated when the tufts must be positioned so that in the finished toothbrush they will have different lengths and/or extend at different angles.

SUMMARY

The present invention features methods and machines for manufacturing toothbrushes. These methods and machines are particularly useful for forming toothbrushes with tufts of bristles that have varying lengths and/or extend from the toothbrush head at varying angles. The inventors have found that such toothbrushes can be manufactured relatively easily and economically by an injection molding process that includes advancing free ends of strands of continuous filaments into a moldbar. The filaments are not cut to bristle-length until after the free ends of the filaments have been advanced into the holes in the moldbar, thus reducing or eliminating the problems that tend to occur when handling cut tufts, as discussed above. As a result, the machine and methods of the invention are efficient and economical and tend to reduce the number of toothbrushes that must be rejected due to tufting problems. In some implementations, the free ends are selectively advanced into blind holes of different depths using a single selective clamping device. Use of a single device to perform the selective advancement results in a relatively small, compact tufting machine.

In one aspect, the invention features a method for manufacturing a toothbrush including: (a) feeding each free end of a plurality of long, continuous strands of filaments into a corresponding blind hole in a moldbar, at least some of the blind holes having different depths, the strands being advanced until the free ends are adjacent bottom surfaces of the blind holes; (b) during step (a), selectively clamping one or more of the strands with a single selective clamping device while advancing the selected strands; (c) cutting the strands of filaments so that an anchoring portion of each cut strand extends above a surface of the moldbar; (d) placing the moldbar in a molding machine so that the anchoring portion of the filaments extends into a molding cavity defined in part by the moldbar, the molding cavity being shaped to form the body of the toothbrush; and (e) delivering resin to the molding cavity to form a toothbrush body around the anchoring portion.

Some implementations include one or more of the following features. The method further includes end rounding the free ends prior to inserting the free ends into the blind holes. The dimensions of each strand correspond to predetermined dimensions of a tuft of bristles on the toothbrush. Each strand fits sufficiently tightly in the corresponding blind hole so that resin is hindered from flowing into the hole when resin is delivered to the mold. At least some of the blind holes are constructed to extend at an angle relative to a top surface of the moldbar. At least some of the blind holes are constructed to extend at different angles than others. The method further includes unwinding the plurality of strands from a single spool. The method further includes tensioning the strands so that the strands are under substantially uniform tension during unwinding. The tensioning step includes feeding the strands through a chamber in which a compressed gas, e.g., compressed air, is blown over the strands. The delivering step includes injection molding.

In another aspect, the invention features a method for manufacturing a toothbrush including: (a) feeding each free end of a plurality of long, continuous strands of filaments into a corresponding blind hole in a moldbar, at least some of the blind holes extending into the moldbar at different angles with respect to a top surface of the moldbar; (b) during step (a), selectively clamping one or more of the strands while advancing the selected strands; (c) cutting the strands of filaments so that an anchoring portion of each cut strand extends above a surface of the moldbar; (d) placing the moldbar in a molding machine so that the anchoring portion of the filaments extends into a molding cavity defined in part by the moldbar, the molding cavity being shaped to form the body of he toothbrush; and (e) delivering resin to the molding cavity to form a toothbrush body around the anchoring portion.

Some implementations include one or more of the following features. The method further includes end rounding the free ends prior to inserting the free ends into the blind holes. The method further includes unwinding the plurality of strands from a single spool. The method further includes tensioning the strands so that the strands are under substantially uniform tension during unwinding. The tensioning step includes feeding the strands through a chamber in which a compressed gas is blown over the strands. The delivering step includes injection molding.

In a further aspect, the invention features a device for manufacturing a plurality of toothbrush tufts from strands of continuous filaments, by feeding free ends of the strands into a moldbar constructed to define a portion of a molding cavity, the moldbar having a plurality of blind holes, at least some of the blind holes having different depths and each blind hole being dimensioned to receive a single strand. The device includes a feeding device including: (a) a single selective clamping device, constructed to advance the free ends of selected strands into the holes in the moldbar so that each free end is inserted to a bottom surface of a corresponding blind hole; and (b) a stationary clamping device, constructed to maintain non-selected strands in a fixed axial position during advancement of selected strands.

Some implementations include one or more of the following features. The device further includes an end rounder positioned to end round the free ends before they are advanced into the blind holes. The device further includes a cutting device to cut the filaments after the strands are advanced into the holes The end rounder is constructed to be moved into and out of engagement with the free ends. At least some of the blind holes are constructed to extend at an angle relative to a top surface of the moldbar. The feeding device is constructed to advance the strands at the same angle as the blind holes. At least some of the blind holes are constructed to extend at different angles than others. The device further includes a second feeding device, and the first and second feeding devices are constructed to advance the strands at angles corresponding to the different angles of the blind holes.

Another aspect of the invention includes a method for applying substantially uniform tension to the continuous strands that are fed into the tufting machine in a feed direction, at different rates, including flowing a fluid medium over the continuous strands in a direction substantially perpendicular to the feed direction. The method further including causing the fluid to flow through a chamber in which the strands are passed. The chamber is constructed of a pair of spaced plates. The plates are spaced 2 mm to 5 mm apart. The chamber is constructed to have an inlet through which the strands enter and an outlet through which the strands exit, and the inlet and outlet are substantially colinear. The fluid medium is a compressed, such as air. In another embodiment, the fluid medium is a liquid, such as water. The strands can comprise a group of filaments or a single filament.

Some implementations include one or more of the following features. The device for manufacturing toothbrush tufts further includes a device for applying substantial uniform tension to a plurality of long, continuous strands that are being fed into the device for manufacturing toothbrush tufts, in a feed direction at different rates including opposed plates defining a chamber that is at least partially closed, the chamber having an inlet through which the strands enter and an outlet through which the strands exit, and a delivery device constructed to deliver a fluid medium to the chamber. The inlet and outlet are substantially colinear. The chamber is constructed to cause the fluid medium to flow in a direction substantially perpendicular to the feed direction. The opposed plates are spaced from about 2 mm to about 5 mm apart. The fluid medium can be compressed gas, such as compressed air. The fluid medium can be a liquid, such as water.

The details of embodiments of the invention are set forth in the accompanying drawings and the description below. Other features and advantages of the invention will be apparent from the description and drawings, and from the claims.

DESCRIPTION OF DRAWINGS

FIG. 1 is a perspective view of a toothbrush having bristle tufts that extend in different directions and at different angles, FIG. 2 is a flow diagram of general steps followed by a tufting machine according to one embodiment of the invention.

FIGS. 3A and 3B are flow diagrams of specific steps followed by the tufting machine.

FIG. 4 is a partial cut-away front view of a tufting machine according to one embodiment of the invention.

FIG. 11 is a top view of a stationary clamping device according to one embodiment of the present invention.

FIG. 12 is a top view of a moldbar according to one embodiment of the invention.

FIGS. 24A and 24B are side views of a rope of bristles looping on itself.

FIG. 25 is a perspective view of a tensioning device suitable for use in the tufting machine shown in FIG. 4.

DETAILED DESCRIPTION

Figure 13:
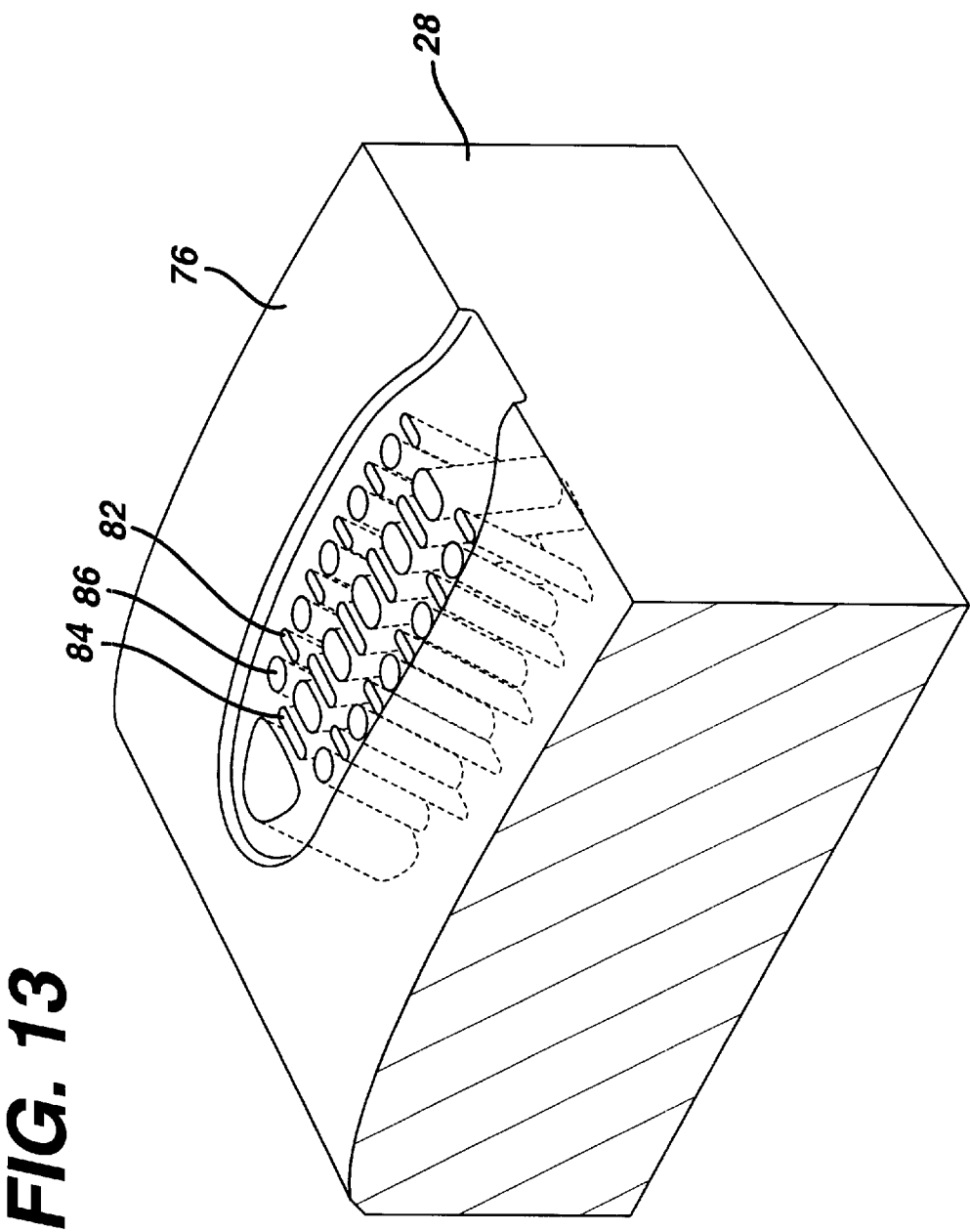
FIG. 13 is a perspective view of one toothbrush cavity of the moldbar of FIG. 12.

Preferred processes of the invention generally include the following steps, which will be discussed briefly now, and explained in further detail below. The processes described below are suitable for the manufacture of a toothbrush 10 having tufts 12, 14, 16 that are of different lengths and extend at different angles, e.g., as shown in FIG. 1. The arrangement of the tufts will be referred to herein as the tuft geometry. The tufts are held in a moldbar 28 (FIGS. 12 and 13), which has the desired tuft geometry and is used as a part of an injection-molding cavity to form a handle 18 around the tufts.

Figure 15:
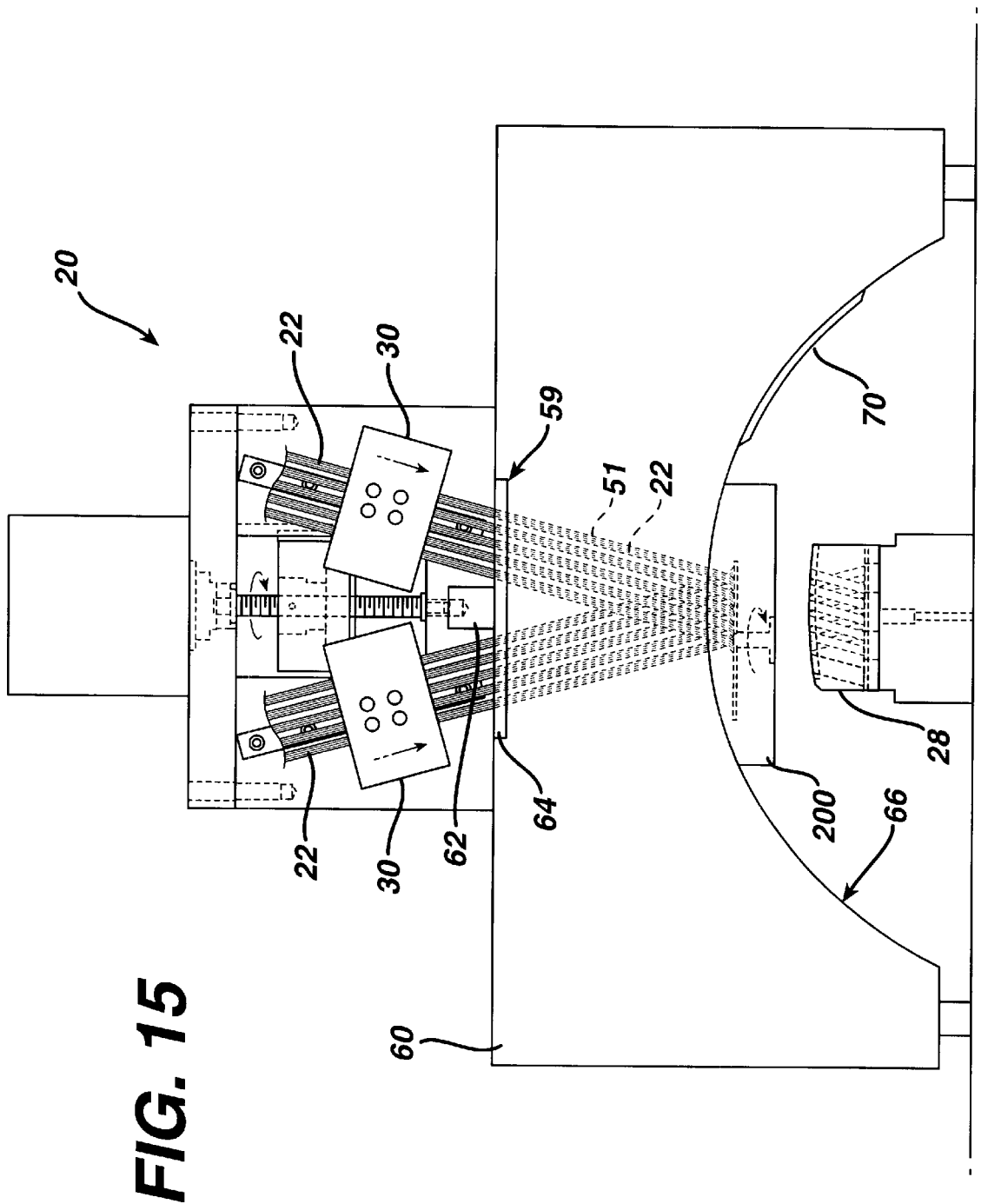
FIG. 15 is a front view of the tufting machine shown in FIG. 4, showing movement of various elements of the tufting machine.
Figure 16:
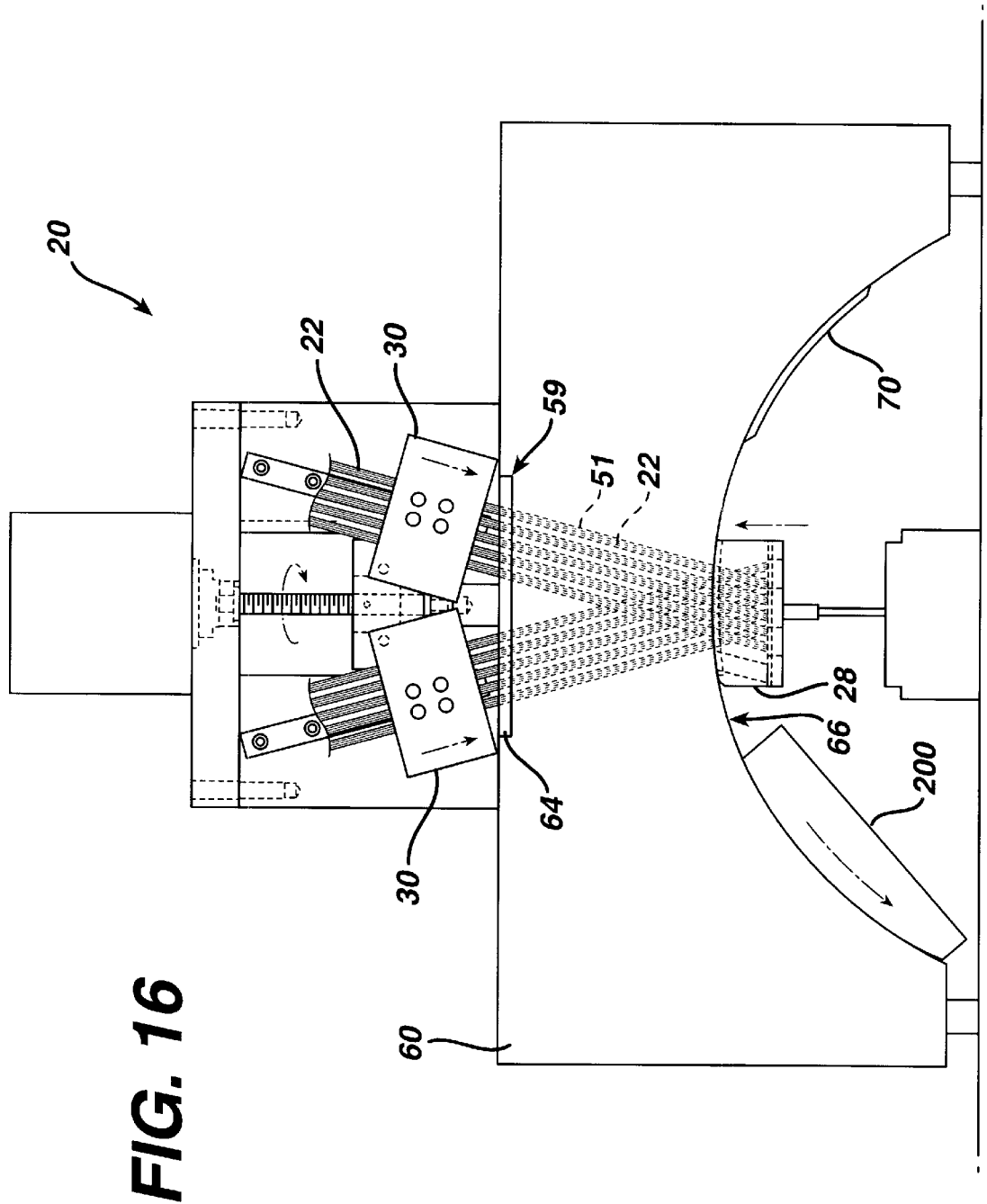
FIG. 16 is a front view of the tufting machine shown in FIG. 4, showing movement of various elements of the tufting machine.
Figure 18:
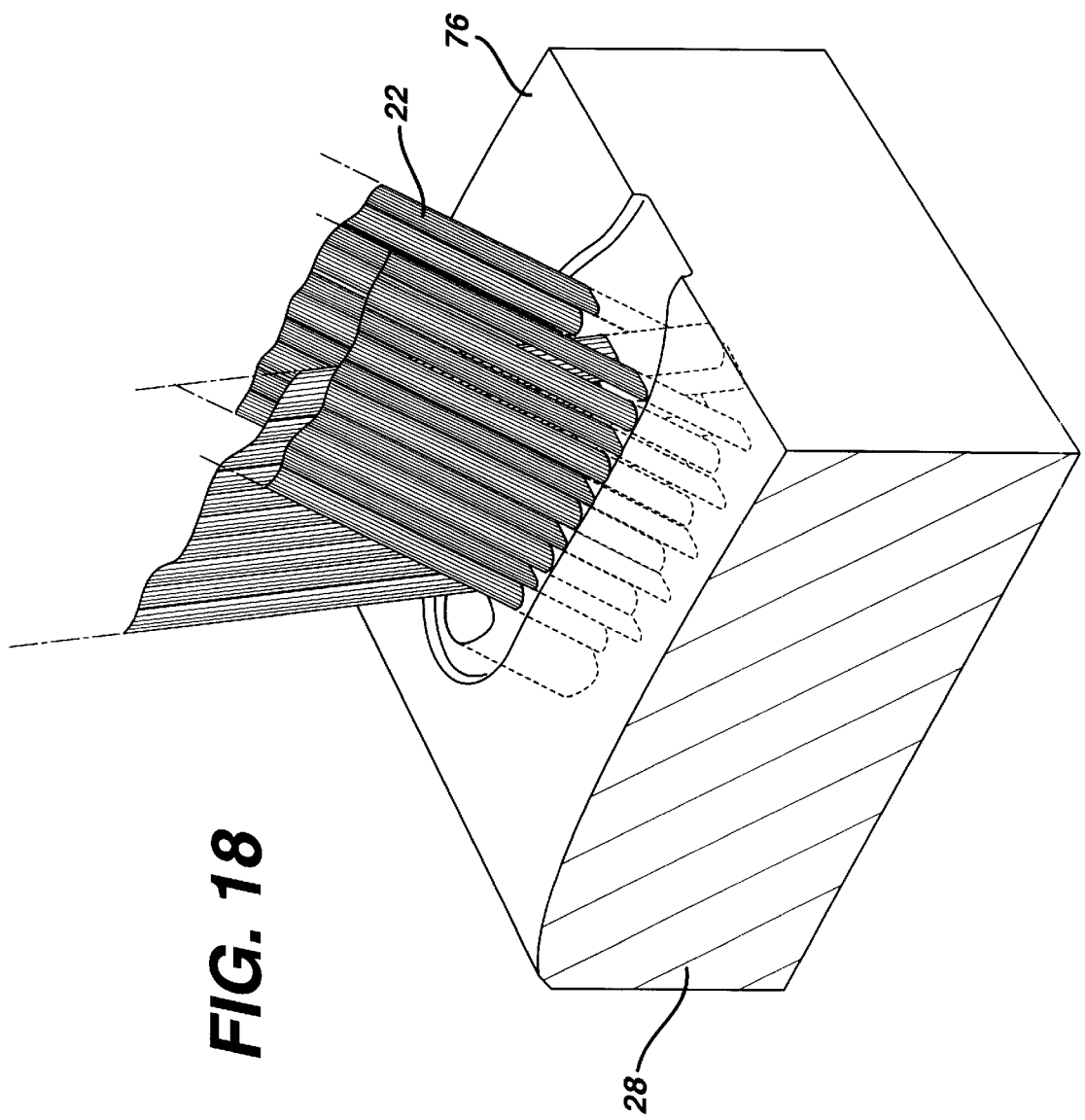
FIG. 18 is a perspective view of the moldbar of FIG. 12 with bristles inserted.
Figure 19:
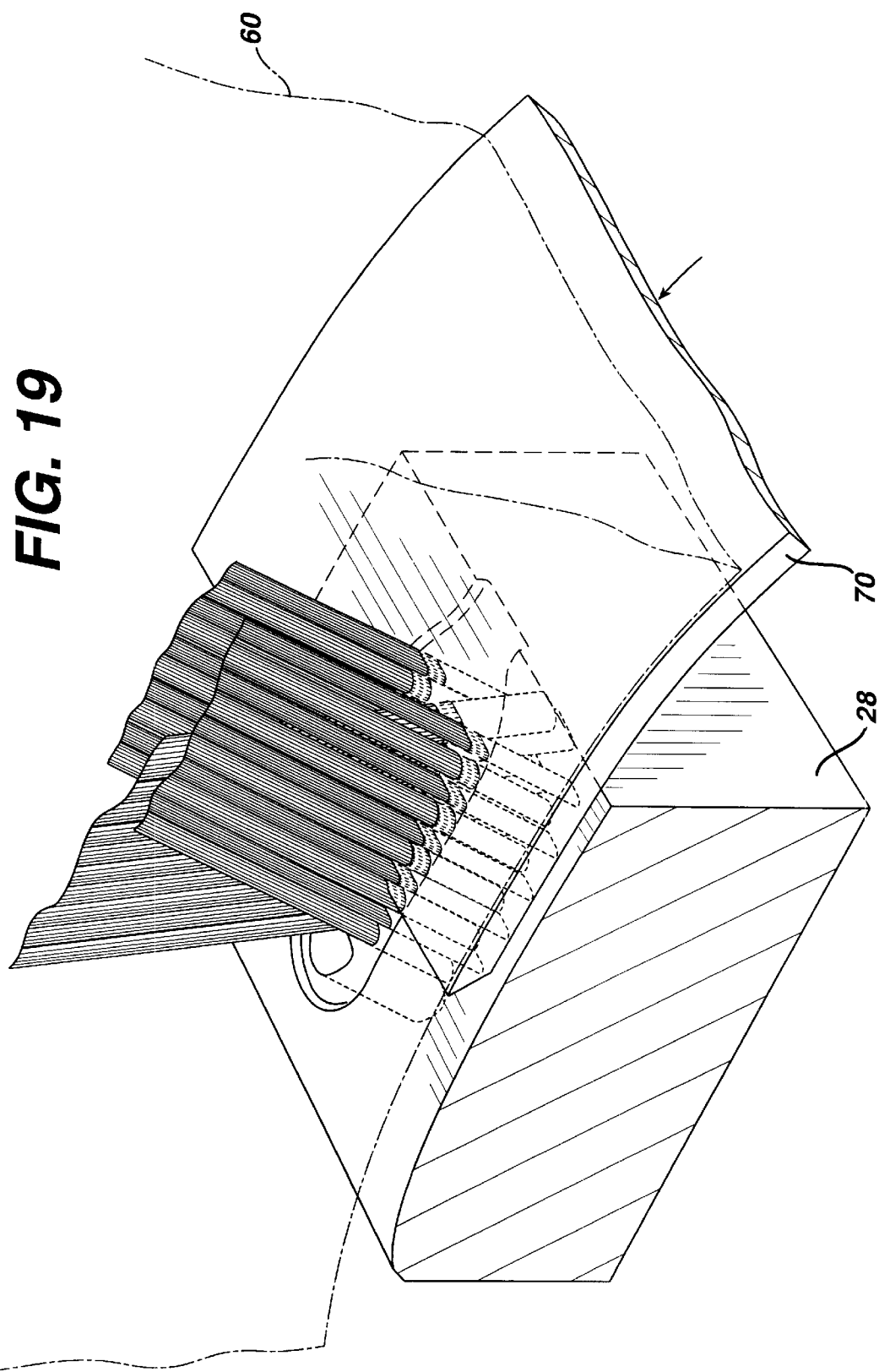
FIG. 19 is a perspective view of the moldbar of FIG. 18 with a blade engaged and the bristles cut.
Figure 22:
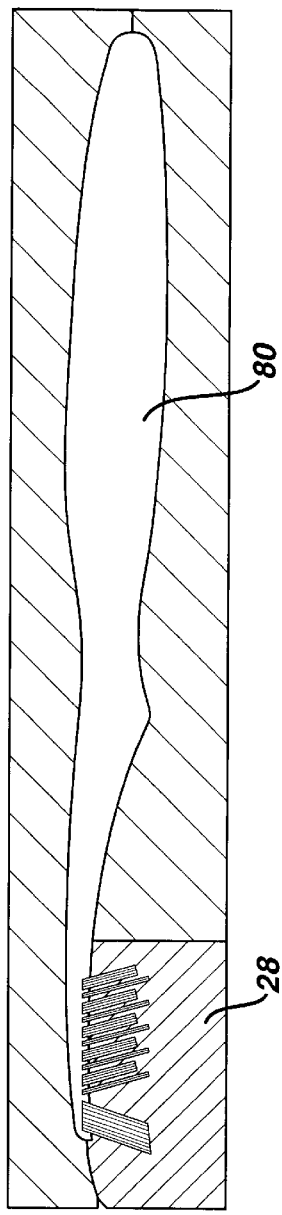
FIG. 22 is a side cut-away view of the moldbar of FIG. 12 engaged with the rest of a toothbrush mold to form a toothbrush handle around the bristles.

Generally referring to FIGS. 2 and 4, groups of filaments of bristle material are provided in a plurality of ropes 22, each rope 22 corresponding in diameter and number of filaments to a tuft on a finished toothbrush. The free ends 24 of the ropes 22 enter a tufting machine 20 (step 110, FIG. 2). After the initial threading step, the ropes 22 are continuously fed from the spool 26 through the tufting machine 20 (step 111, FIG. 2). The free ends 24 of the ropes 22 are end-rounded (FIG. 15 and step 112, FIG. 2) before being advanced into the moldbar 28 (FIG. 16 and step 114, FIG. 2). Once the free ends 24 of the ropes 22 are within the moldbar 28, the bristles are cut to length (FIGS. 18–19 and step 116, FIG. 2). Each moldbar 28 is configured to produce multiple toothbrushes (FIG. 12), so this process is continued (step 117, FIG. 2) until the entire moldbar 28 is full of bristles. Once the moldbar 28 has been filled with bristles, the moldbar 28 is advanced into an injection molding station where the handle 18 is formed around the bristles (FIG. 22 and step 118, FIG. 2).

Figure 9:
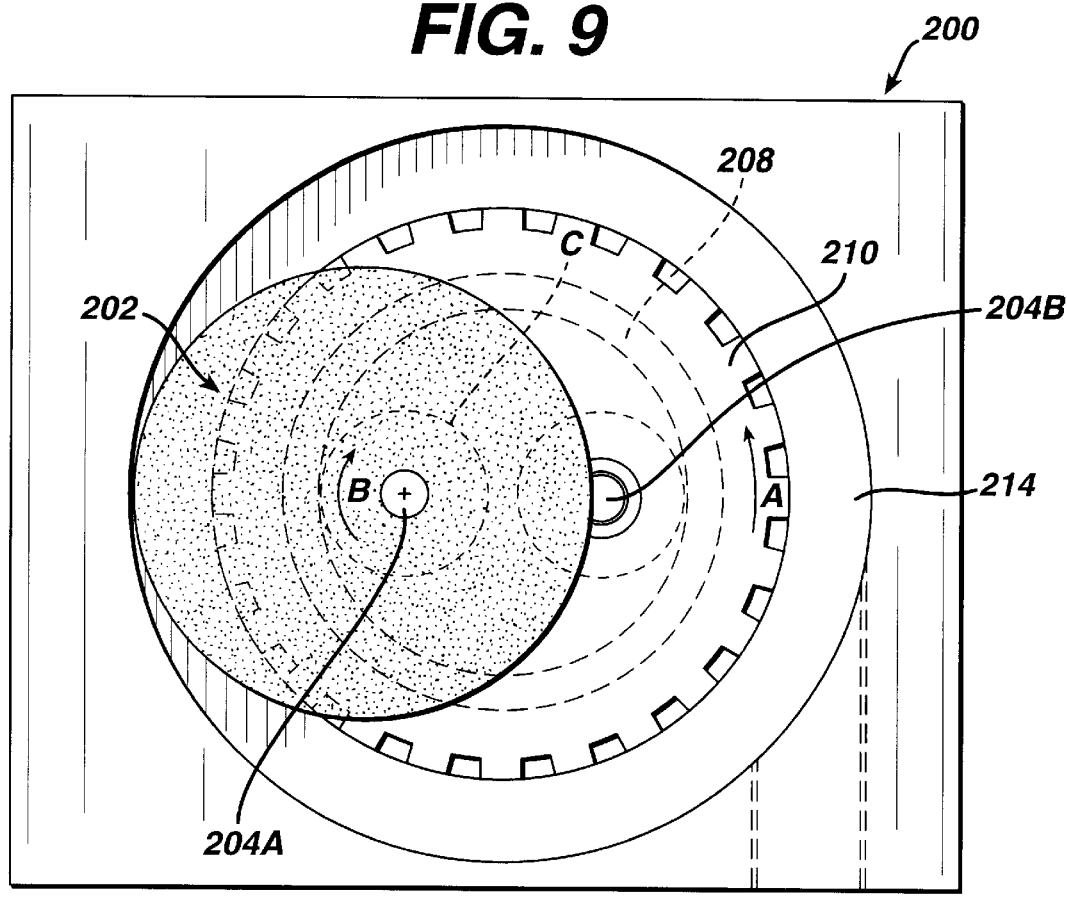
FIG. 9 is a top view of an end-rounding device according to one embodiment of the present invention.

Prior to introduction into the moldbar 28, the free ends 24 of the filaments in ropes 22 are end-rounded within the tufting machine 20 by an end-rounding device 200 (FIG. 9). The end-rounding device 200 of the present invention is low-profile and air driven, which allows the free ends 24 of the ropes 22 to be end-rounded within the tufting machine 20. Conventional electric motor driven end-rounding devices would not easily fit within the tufting machine, and tend to be too heavy to move into and out of engagement with the free ends 24 of the ropes 22 quickly. The air-driven end-rounder 200 allows for a smaller machine, thereby saving valuable floor space.

Referring to FIG. 4, the ropes 22 are advanced through the tufting machine 20, towards the moldbar 28, by a feeding device 30. Feeding device 30 is constructed to selectively advance the individual ropes 22 to different depths within the moldbar 28 corresponding to the tuft lengths of tufts 12, 14, 16 in FIG. 1, as will be discussed below. This selective advancement capability results in efficient and economical manufacture of toothbrushes 10 having tufts of different lengths. The tufting machine 20 can include any desired number of feeding devices 30; two are shown in FIG. 4. Multiple feeding devices 30 can be oriented at different angles relative to the vertical, as shown in FIG. 4, to allow the ropes 22 to be advanced into the moldbar 28 at opposing angles, resulting in a finished toothbrush 10 with tufts that extend at different angles, as shown in FIG. 1. The selective advancement capability also results in a smaller tufting machine, which allows the process to occur closer to the moldbar thereby minimizing tuft damage or feeding problems.

The tufting machine 20 also includes a manifold 60 into which the ropes 22 pass after they have passed through the feeding devices 30. The manifold 60 has guideways 51 that keep the ropes 22 on a path directly to the moldbar 28. Within the manifold 60 is a stationary clamping device 59, which works with the feeding devices 30 and the blade 70, as will be described filly below. Also movably mounted on the manifold 60 is the end-rounding device 200, which can be moved into and out of engagement with the free ends 24 of the ropes 22.

Referring to FIGS. 12, 13, 17A and 17B, the tufting machine 20 advances the free ends 24 of each of the ropes 22 into blind holes 82, 84, 86 in moldbar 28. Each of the blind holes is shaped and sized to accept a single rope 22 in a close-fitting engagement. Each of the holes 82, 84, 86 is machined to a depth and at an angle that will provide the desired tuft geometry. Each hole 82, 84, 86 is filled by the tufting machine 20, with the finished free end 24 of each rope 22 being inserted to the proper depth and at the proper angle.

After the ropes have been advanced fully into the moldbar 28, i.e., after the free end 24 of each of the ropes 22 contacts the bottom 78, 79 of each blind hole 82, 84, 86 of the moldbar 28, the filaments are clamped by a stationary clamping device 59 and cut so that a portion of each filament extends above the top surface 76 of the moldbar 28. This portion will extend into the mold cavity 80 (see FIG. 22), and thus will be embedded in the injection molded toothbrush body 18. The end rounded free ends 24 of the filaments will be the free or working ends of the bristles 12, 14, 16 in the finished toothbrush 10 (FIG. 1). Each moldbar 28 is configured to produce multiple toothbrushes, as shown in FIG. 12. Therefore, after cutting, the moldbar 28 is either indexed to the next set of unfilled blind holes 82, 84, 86, or, if the moldbar 28 is full, removed and transferred directly to an injection-molding machine (not shown), where it is used to define part of the molding cavity 80 or to an intermediate step, such as fusing the filaments together to form an anchor.

The ropes 22 of filaments are not cut to tuft length until the end-rounded free ends 24 have been fully advanced into the moldbar 28. Feeding continuous filaments, rather than cut tufts, into the moldbar 28 holes eliminates the sometimes problematic picking, tuft-transfer and moldbar-filling steps involved in filling a moldbar 28 with bristles, and as a result generally also reduces manufacturing problems. Handling cut tufts can result in waste and cut tufts can fall into the processing machinery, which will cause problems with that machinery.

The steps of this process, and the machine components used to perform each step, will now be discussed in further detail.

The Feeding Device

As discussed above, the feeding device 30 selectively clamps the ropes 22 that pass through the feeding device 30, and advances the clamped ropes 22 towards the moldbar 28.

Figure 6A:
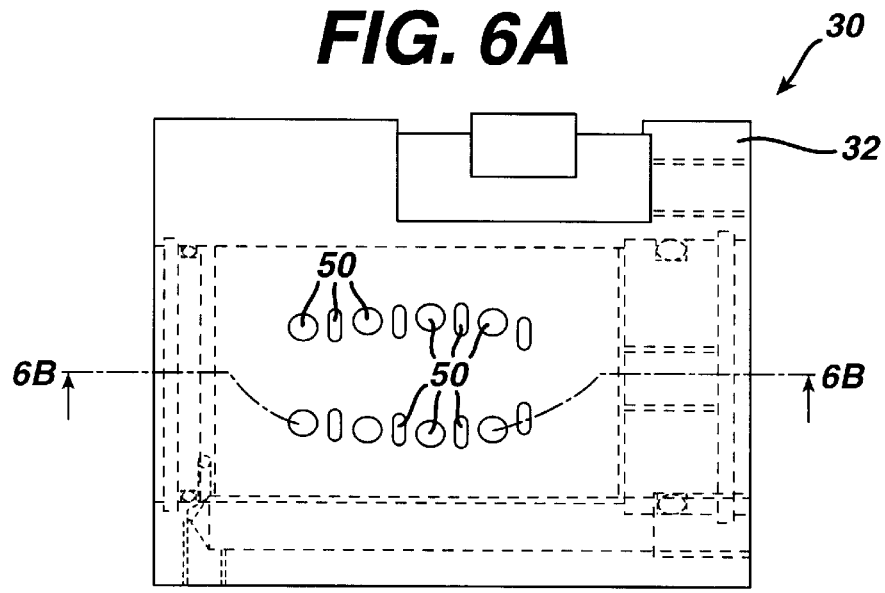
FIG. 6A is a top view of a feeding device of the tufting machine shown in FIG. 4 taken along line 6A—6A, with the feeding device shown in its unbiased state.
Figure 6B:
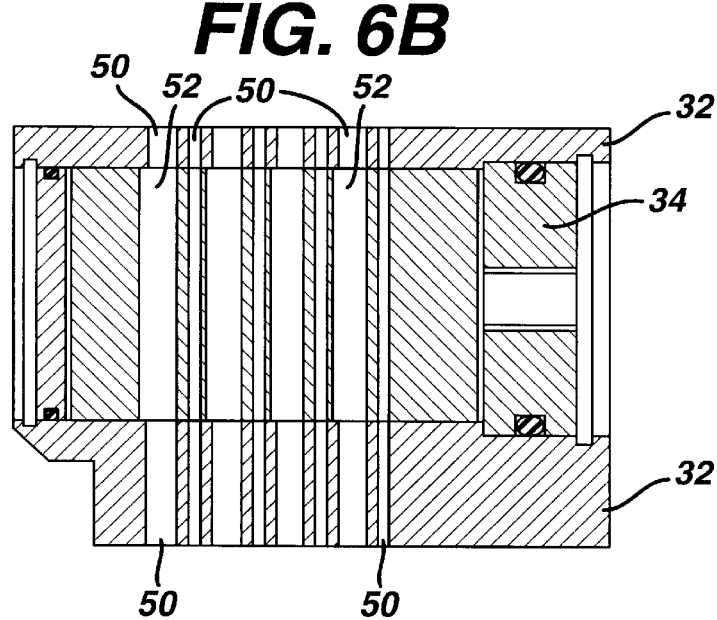
FIG. 6B is a cross-sectional view of the feeding device shown in FIG. 6A, taken along line 6B—6B.
Figure 6C:
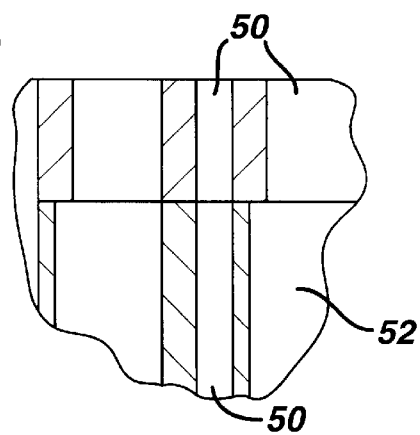
FIG. 6C is an enlarged view of a portion of the feeding device shown in FIG. 6B.

Referring to FIGS. 6A–6C, the feeding device 30 includes a pneumatic cylinder 32 with a piston 34. As shown by arrow A in FIG. 4, the feeding device 30 moves in a generally vertical direction relative to the frame 48 along a slide 38, and is moved by a cam 36. A motor 44 connected to the cam 36 by a leadscrew 40 and a leadscrew nut 42 drives the cam 36.

Referring to FIGS. 6A–6C, the feeding device 30 has guideway holes 50 through which the ropes 22 pass. These guideway holes 50 pass through the feeding device 30, including both the cylinder 32 and the piston 34, and communicates with guideway holes 51 that extend through the manifold 60. Thus, guideway holes 50 and 51 define a continuous pathway from the top of the tufting machine 20 to the moldbar 28. The guideway holes 50 are shaped like the final shape of the tufts of bristles 12, 14 that will be molded into the toothbrush handle 18. Guideway holes 50 guide the ropes 22 through the tufting machine 20, and provide selective clamping as will be described below.

Figure 7A:
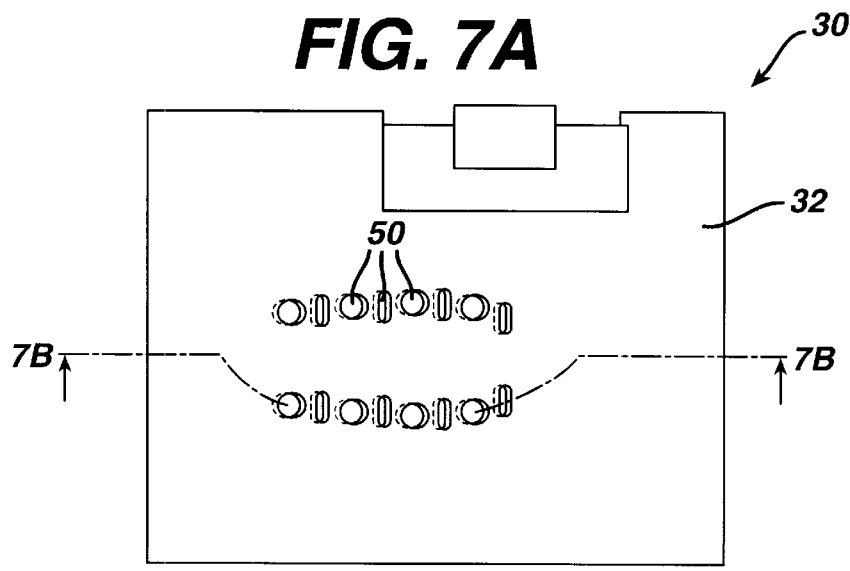
FIGS. 7A–7C are views corresponding to FIGS. 6A–6C, with the feeding device biased to one side.
Figure 7B:
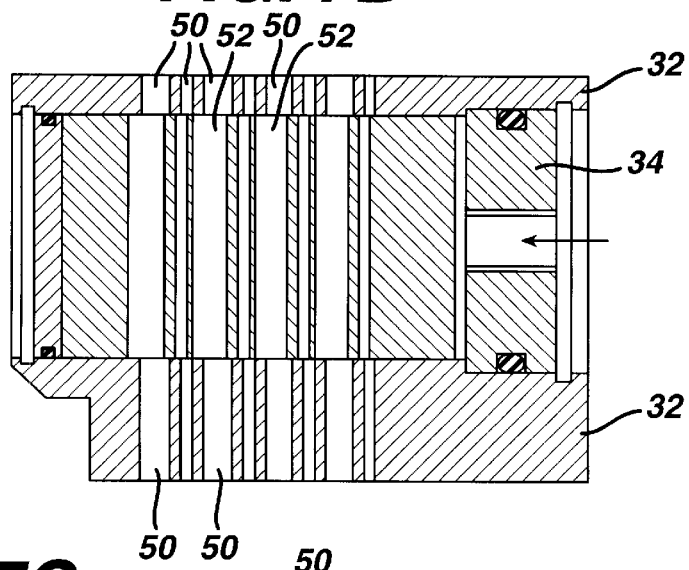
Figure 7C:
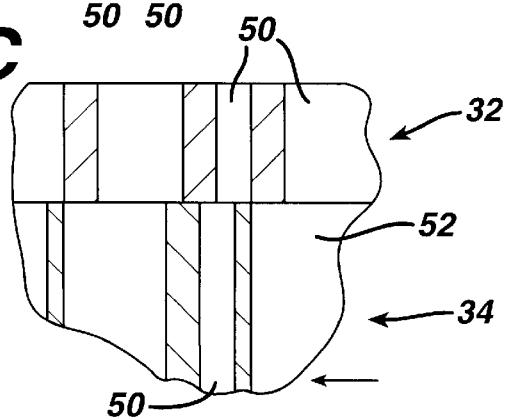
Figure 8A:
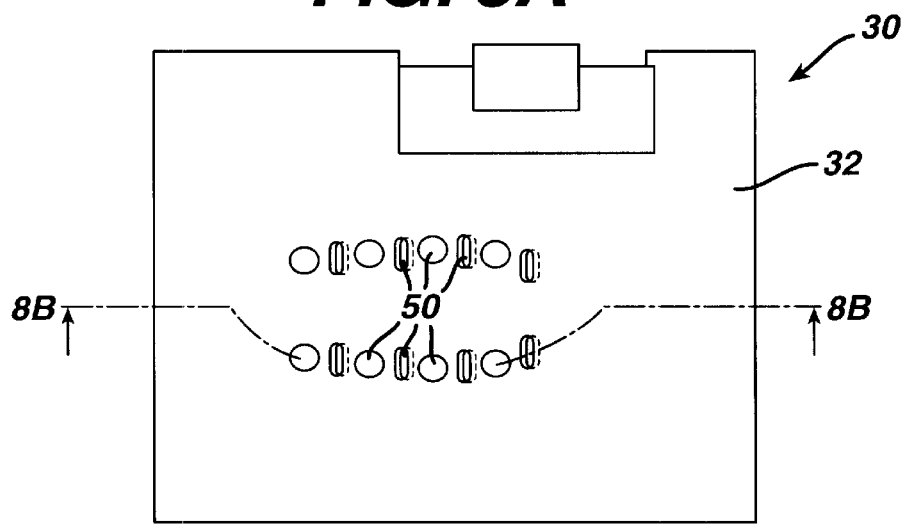
FIGS. 8A–8C are views corresponding to FIGS. 6A–6C, with the feeding device biased to a side opposite that shown in FIGS. 7A–7C.
Figure 8B:
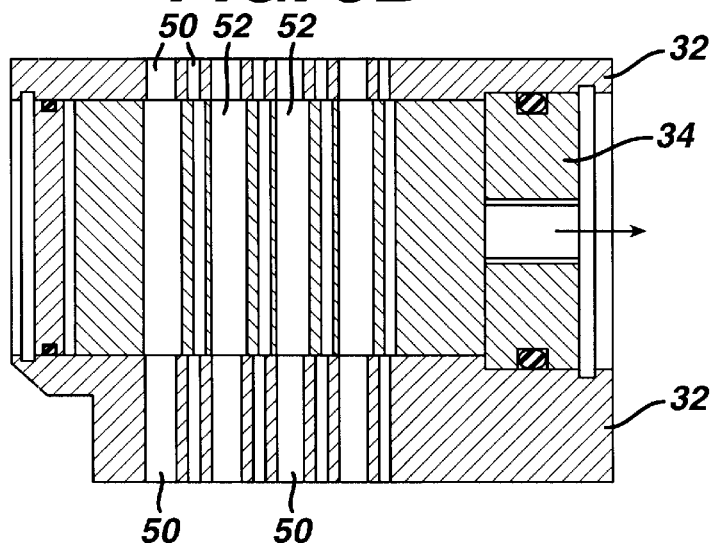
Figure 8C:
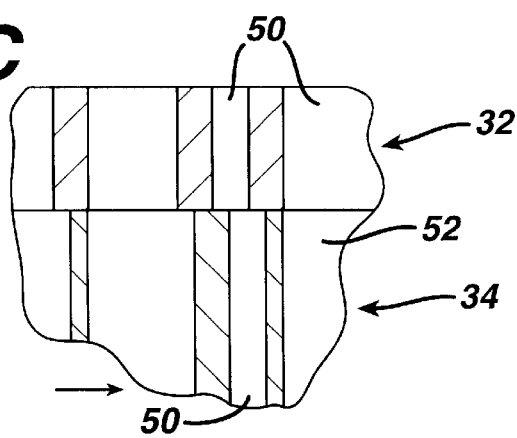

The piston 34 of the feeding device 30 is capable of being biased to the center, as shown in FIGS. 6A–6C, to the left, as shown in FIGS. 7A–7C, or to the right, as shown in FIGS. 8A–8C. When the piston 34 is biased to the center, as shown in FIGS. 6A–6C, the guideway holes 50 are generally aligned and do not grip the ropes 22. Certain guideway holes 52 within the piston 34 are elongated holes to allow selectivity when gripping the ropes 22. When the piston 34 is biased to the left approximately 0.020 inches, as shown in FIGS. 7A–7C, the guideway holes 50 and elongated guideway holes 52 misalign at all locations and grip all the ropes 22 passing through. When the piston 34 is biased to the right approximately 0.020 inches, as shown in FIGS. 8A–8C, only the non-elongated guideway holes 50 misalign, allowing the feeding device 30 to grip only the ropes 22 that pass through the misaligned holes.

As will be discussed in detail below, the selectivity provided by elongated holes 52 allows the feeding device 30 to move certain ropes 22 further through the tufting machine 20 than others, thereby allowing tufts of varying lengths to be fed into the moldbar 28 using a single feeding device 30. One advantage of a single feeding device 30 that selectively moves certain ropes 22 is compact size. Without the selectivity of the present feeding device 30, two gripping devices would be needed to accomplish the same task, thereby increasing the size of the tufting machine 20 and the complexity of threading the ropes 22 through the tufting machine 20. Further, the small size of feeding device 30 allows two feeding devices 30 to be mounted at different angles to each other (as shown in FIG. 4), thereby facilitating easy manufacture of toothbrushes with tufts of bristles at opposing angles, such as the toothbrush 10 shown in FIG. 1.

The Manifold

As described above, the manifold 60 is the part of the machine between the feeding devices 30 and the moldbar 28 that keeps the ropes 22 on a path towards the moldbar 28 and supports the end rounding device 200 and a stationary clamping device 59.

Figure 5:
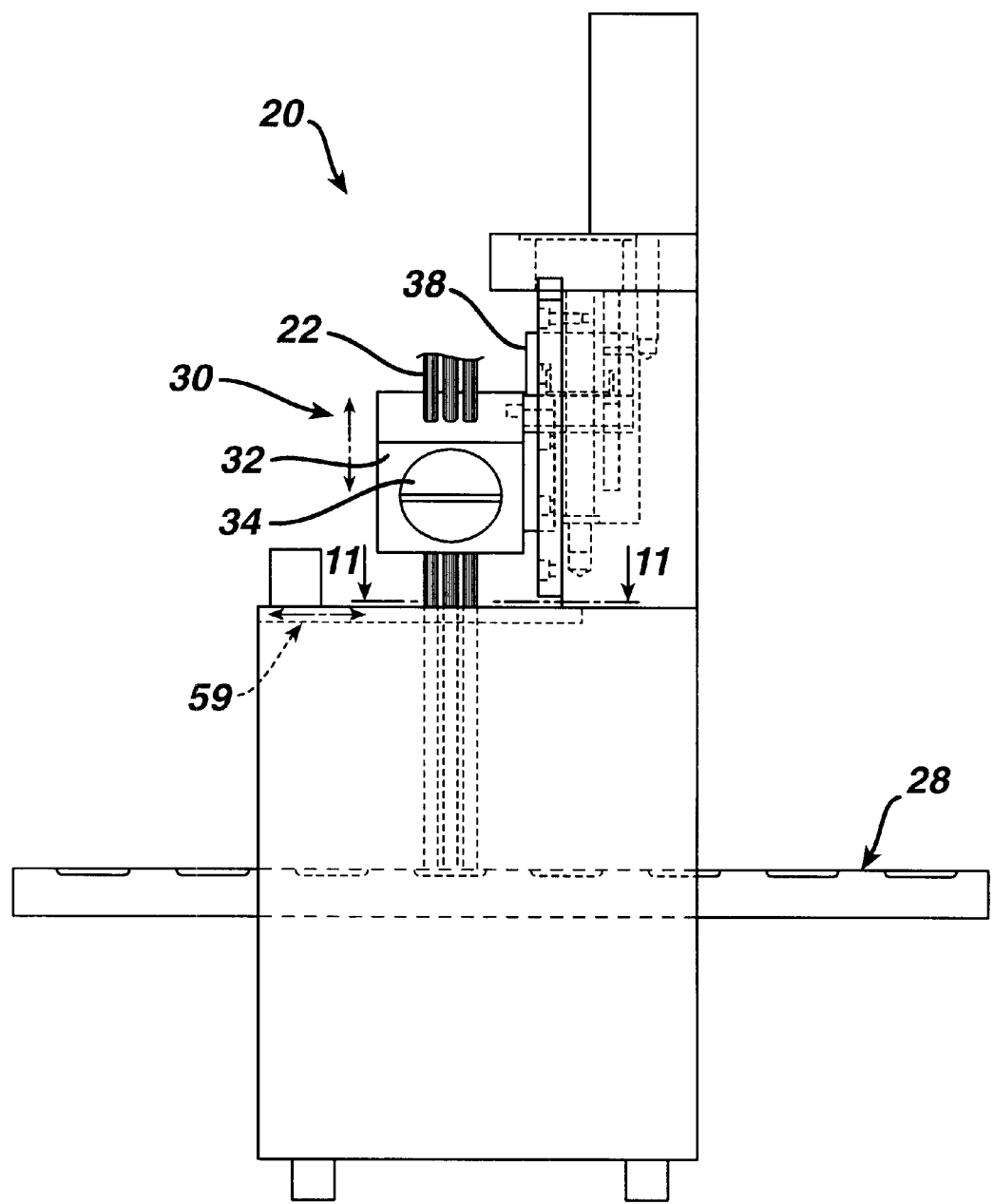
FIG. 5 is a side view of the tufting machine shown in FIG. 4.

Referring to FIGS. 4 and 5, the manifold 60 is below the feeding device 30. Fitted into the manifold 60 is a stationary clamping device 59, which is similar to the feeding device 30 in that it allows for selective gripping by using elongated holes. The stationary clamping device 59 consists of a plate 64 (FIG. 11) movably mounted to the manifold and a piston 62 connected to the plate 64 to move the plate 64 between three positions. The guideways 51 that run through the manifold 60 also run through the plate 64, and are aligned precisely when the piston 62 is in a centered position. When pressure is applied to one end of the piston 62, all guideways in the plate 64 misalign thereby clamping all the ropes 22. When pressure is applied to the other end of the piston 62, only non-elongated guideways in the plate 64 misalign, thereby clamping only selected ropes 22.

Figure 14:
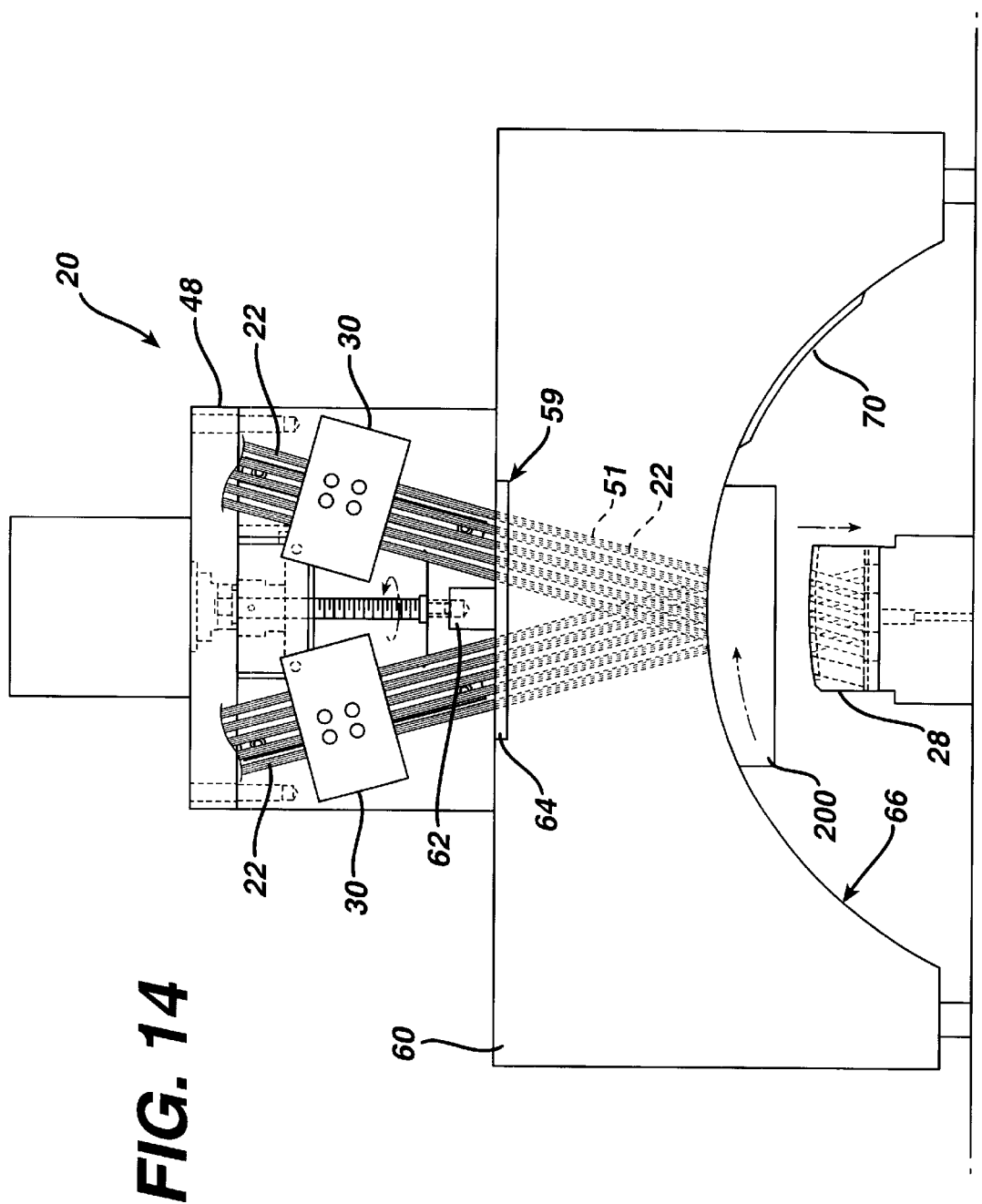
FIG. 14 is a front view of the tufting machine shown in FIG. 4, showing movement of various elements of the tufting machine.

The manifold 60 also supports an end-rounding device 200. The end-rounding device 200 is described more fully below. The end-rounding device 200 can be moved into a position below the guideways 51 in the manifold 60 so the free ends 24 of the ropes 22 can be put into contact with the end-rounding device 200 (FIGS. 14 and 15). The manifold 60 supports the end-rounding device 200 in T-slots (not shown) in the bottom of the manifold 66, which allow the end-rounding device 200 to move along the bottom of the manifold 66.

The End-Rounding Device

Figure 10:
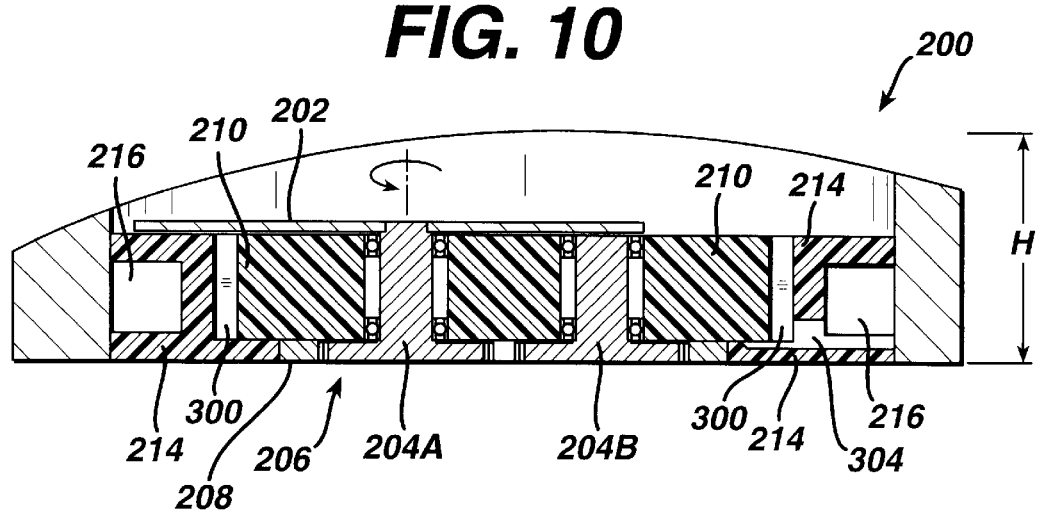
FIG. 10 is a side cut-away view of the end-rounding device of FIG. 9.
Figure 9A:
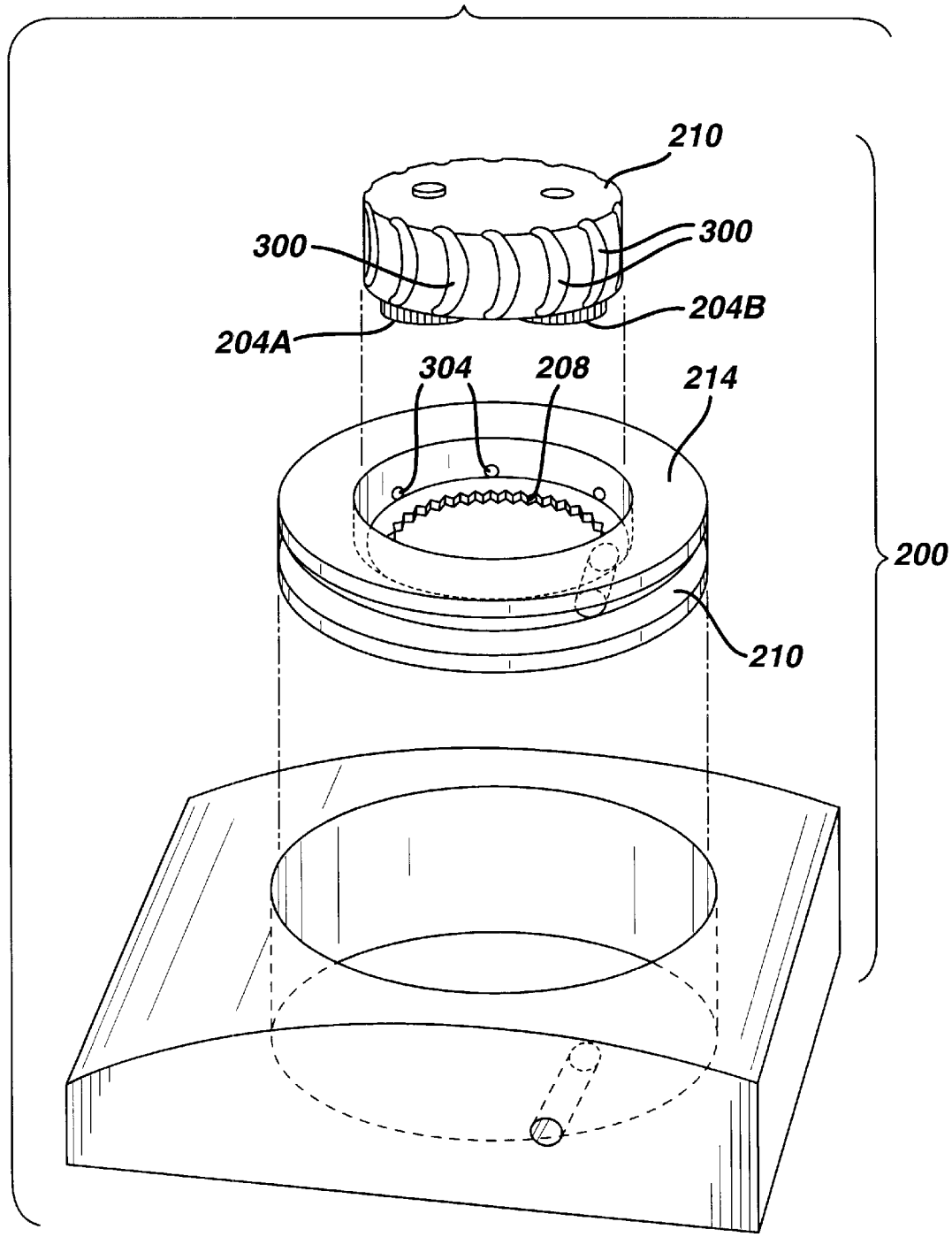
FIG. 9A is a perspective view of the end-rounding device of FIG. 9.

The end-rounding device 200, shown in detail in FIGS. 9, 9A and 10, has a relatively low profile and is relatively light and compact, allowing the end-rounding device to be easily moved transversely into and out of engagement with the free ends of the filaments. Because the end-rounding device can be easily moved in this manner, during the entire tufting process the filaments need only be advanced axially, and do not need to be transported out of their plane of axial movement to engage the end-rounding device. Typically, the end-rounding device is less than 2 inches in height (dimension H in FIG. 10), more preferably less than 1.5 inches, and weighs less than 5 pounds.

The end-rounding device also has a continually varying elliptical grinding path, described below, that allows the sanding surface of the end-rounding device to attack the free ends 24 of the individual filaments from all sides, resulting in uniform, high quality end-rounding with no damage to the individual filaments.

The end-rounding device 200 includes a sanding wheel 202 that is fixed to a planet gear 204A that extends through a planet carrier 210. A second planet gear 204B also extends through the planet carrier 210 to balance the system. The planet gears 204A, 204B engage a stationary ring gear 208 mounted below the planet carrier, as described below, which causes the planet gears to rotate as the planet carrier rotates.

The rotation of the planet carrier 210 is driven by air, and the rotation of the planet carrier drives the rotation of the planet gear 204A, due to the engagement of the planet gears with the stationary ring gear 208. Thus, the sanding wheel 202 is entirely air driven, contributing to the low profile and compact size of the end-rounding device.

The planet carrier 210 is a turbine that drives the end-rounding device. The planet carrier 210 is rotated about its axis (arrow A, FIG. 9) by airflow against vanes 300 (FIG. 9A) which are arranged at spaced intervals around the periphery of the planet carrier. The vanes 300 are configured to allow compressed air to rotate the planet carrier 210 efficiently and at high rates of revolution, e.g., at least 5,000 rpm, more preferably at least 10,000 rpm. The planet carrier 210 sits within a radial/thrust bearing 214, which includes an air manifold 216 to deliver the compressed air to the planet carrier 210 through openings 304 (FIG. 9A).

As discussed above, when the planet carrier 210 rotates, the planet gears 204A, 204B engage stationary ring gear 208. Stationary ring gear 208 is press-fit into the radial/thrust bearing 214 so that it does not move when engaged by the planet gears. As a result, this engagement causes the planet gears 204A, 204B to rotate about their axes in a direction (arrows B, FIG. 9) opposite to the direction of rotation of the planet carrier 210. Stationary ring gear 208 and planet gears 204A, 204B together define a planetary drive mechanism 206, which drives the sanding wheel 202 in a deviating elliptical orbit discussed below.

Because the planet carrier 210 acts as a drive mechanism and as an air bearing (replacing a ball bearing that would be required in a motor-driven end-rounding device), the end rounding device 200 requires relatively few parts, further contributing to its low profile and compact design. Moreover, the use of an air as a lubricant allows very high rates of revolution, as discussed above, without requiring liquid lubrication that could contaminate the filaments. Further, the planet carrier 210 provides a barrier between the sanding wheel 202 and the planetary drive mechanism 206, thereby preventing any grinding dust from contaminating the planetary drive mechanism that could cause premature wear in the gears.

The preferred method of end-rounding the free ends of the filaments is to attack the filaments from all sides. However, if the number of teeth on the planet gear 204 were exactly half the number of teeth on the stationary ring gear 208, any point on the pitch circle C of the planet gear would inscribe a straight line when the planet carrier is rotated, the line being a diameter of the stationary ring gear 208. Each revolution of the planet carrier 210 would move the same point on the pitch circle continually along the same straight line. This is known as Cardanic Motion. This straight line would attack the filaments from only two sides. However, the path of the straight line may be deviated slightly by setting the tooth ratio of the stationary ring gear 208 to the planet gear 204 at slightly higher than 2:1, generally by a few teeth. With this tooth ratio, when planet carrier 210 is rotated, any point on the pitch circle C (FIG. 9) of the planet gear 204 will inscribe a straight line that slightly changes direction with every rotation of the planet gear 204. This deviating straight line of a point on the sanding wheel allows the sanding wheel to attack the free ends of the filaments from all sides, resulting in uniform end-rounding.

If the sanding wheel 202 is mounted on the planet gear 204 so that the center of the sanding wheel lies on the pitch circle C, the sanding wheel comes to a momentary halt at the end of its stroke and tends to reverse direction along nearly the same path; i.e. the deviating straight line described above. This generally causes the filaments that are being sanded to be bent over in a cantilever fashion by the sanding wheel 202 during the "in" stroke, and may cause the filaments to be twisted out of plane when the sanding wheel 202 reverses direction. This action may damage the filaments and/or may not produce well-rounded ends 24. Thus, it is preferred that the sanding wheel 202 be mounted with its center affixed to a point internal to the pitch circle C, so that the sanding wheel 202 will inscribe an ellipse rather than a straight line. When the sanding wheel 202 approaches its apogee it begins to rotate the filaments, achieving the opposite bend more or less gradually instead of suddenly. The slight change in direction of the inscribed line, as described above, will change the direction of the major diameter of the ellipse, resulting in a continual change in the direction of the overall elliptical path of the sanding wheel. Combining both the deviating straight line, which allows the filaments to be attacked from all sides, and the elliptical path, which prevents the filaments from bending in a cantilever fashion, provides well-rounded filaments.

It can be appreciated that the sanding wheel 202 may also be mounted such that its center point is outside the pitch circle, which will also allow an elliptical path to be achieved. Further, it should be understood that only certain points on the sanding wheel inscribe the deviating elliptical path. All other points on the sanding wheel with inscribe varying elliptical patterns, a small set that will degenerate into a straight line and a small set that will inscribe a circle. However, the majority inscribes some fashion of an elliptical pattern, and filaments end-rounded utilizing the described device are well rounded.

The Feeding Process

Referring to FIGS. 4–5, the ropes 22 are fed from spools 26 into the tufting machine 20. The ropes 22 are threaded through the feeding device 30 and manifold 60 via guideway holes 50 (see FIG. 6A) and 51, which generally keeps the ropes 22 on trajectory toward the moldbar 28.

Figure 3B:
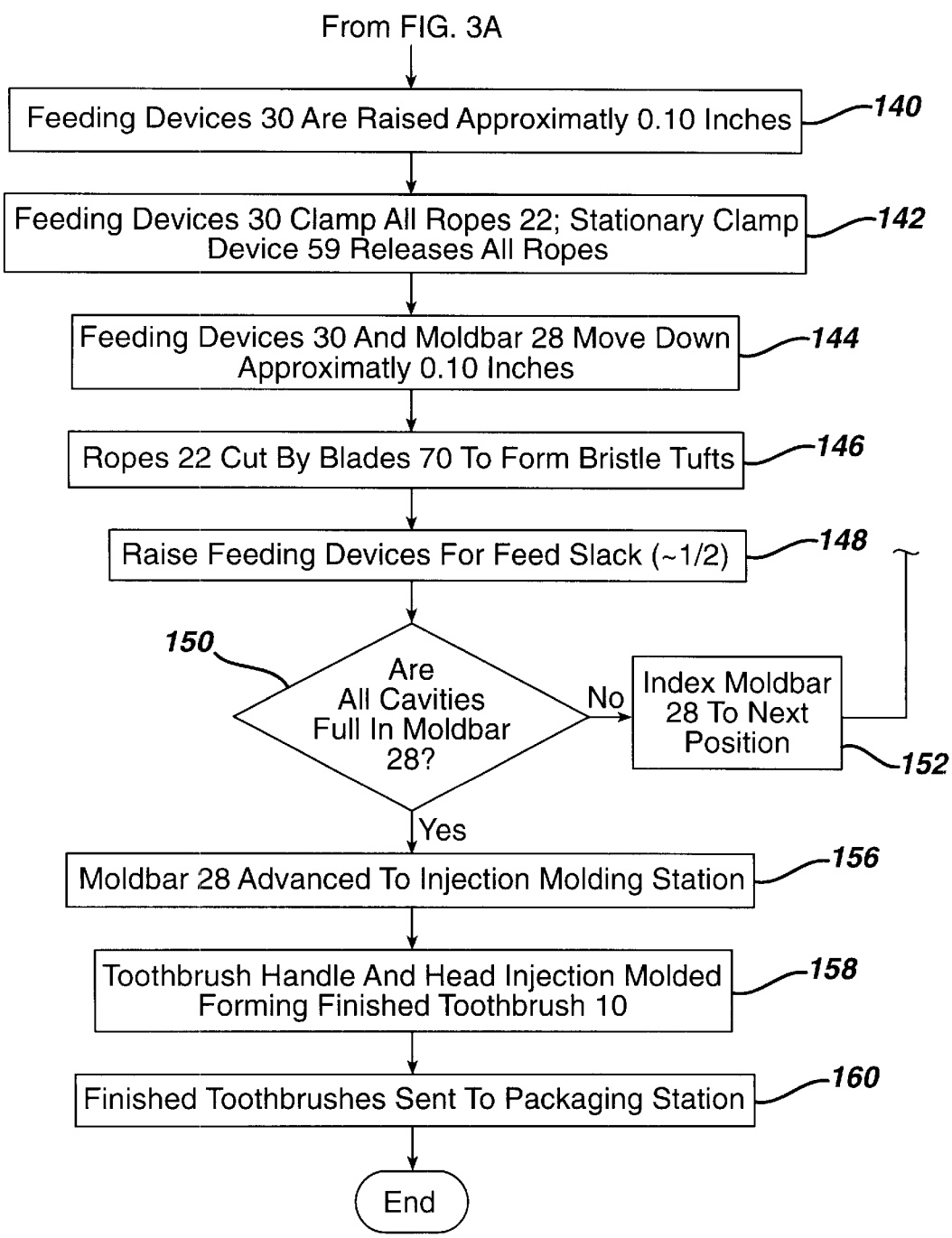

During the initial threading, the ropes 22 are fed into the tufting machine 20 to a point just above the bottom of the manifold 66. Referring to FIGS. 3A–3B, the ropes 22 are advanced through the tufting machine 20 by the feeding device 30, in cooperation with the stationary clamping device 59. Describing the sequence starting with the ropes 22 just above the bottom of the manifold 66, the feeding device 30 is biased to the left to clamp all the ropes 22 (step 120, FIG. 3A). The end-rounding device 200 is moved into position below the guideways 51 of the manifold 60 (FIG. 14) (step 122, FIG. 3A). The feeding device 30 is advanced to bring the free ends 24 of the ropes 22 into contact with the sanding wheel 202 of the end-rounding device 200 (FIG. 15) (step 124, FIG. 3A), and the stationary clamping device 59 is biased to clamp all the ropes 22. Once the free ends 24 of the ropes 22 have been sufficiently rounded, the stationary clamping device 59 is biased to unclamp all the ropes 22, the feeding device 30 withdraws the ropes 22 from the sanding wheel 202 to a point just above the bottom of the manifold 66 and the end-rounder 200 is moved back to its original position (step 126, FIG. 3A). The moldbar 28 is moved upward into engagement with the bottom of the manifold 66 (step 127, FIG. 3A).

Figure 17A:
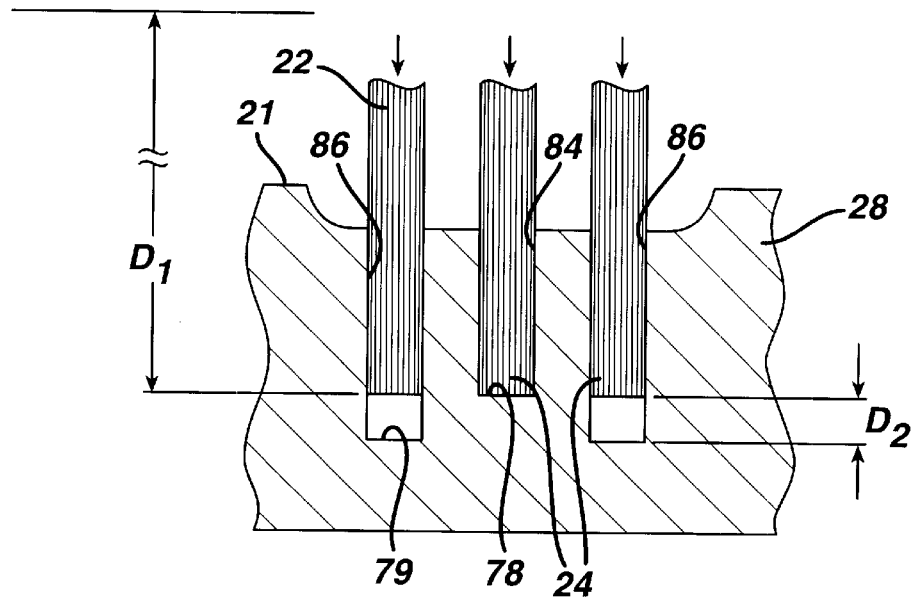
FIG. 17A is a side cut-away view of a portion of the moldbar of FIG. 12 showing the bristles being inserted.
Figure 17B:
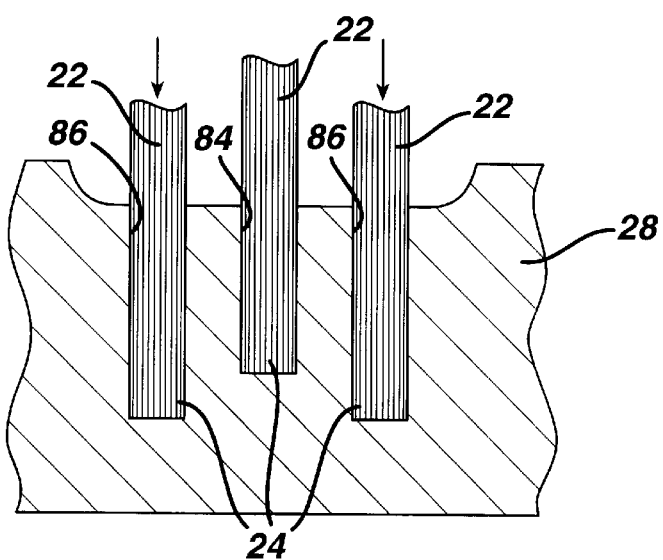
FIG. 17B is a side cut-away view of a portion of the moldbar of FIG. 12 showing the bristles being inserted.

The piston 34 of the feeding device 30 continues to be biased to clamp all the ropes 22 passing through (biased to the left as shown in FIGS. 7A–7C), and the stationary clamping device 59 is biased to allow the ropes 22 to move freely. The feeding device 30 is moved downward, advancing the ropes 22 forward toward the moldbar 28 (FIG. 16) (step 128, FIG. 3A). The distance D1 moved corresponds to a point just above the bottom of the manifold 66 to the bottom 78 of the more shallow blind holes 82, 84 of the moldbar 22, which correspond to shorter tufts 12 (FIG. 1), thereby advancing the free end 24 of the ropes 22 to the bottom 78 of those more shallow blind holes 82, 84 in the moldbar 28 (FIG. 17A).

The piston 64 of the stationary clamping device 59 is then biased in the opposite direction to clamp all the ropes 22, and the piston 34 of the feeding device 30 is biased to the center (FIGS. 6A–C) to unclamp all the ropes 22 (step 130, FIG. 3A). The feeding device 30 then moves backwards along the ropes 22 a distance equal to the difference in length between the shorter bristles 12 and longer tufts 14 (FIG. 1) of the final product, i.e. distance D2 in FIG. 17A (step 132, FIG. 3A). The stationary clamping device 59 prevents the ropes 22 from pulling out of the moldbar 28 by friction between the feeding device 30 and the ropes 22 as the feeding device 30 moves upward.

The piston 34 of the feeding device 30 is next biased to the right to selectively clamp the ropes 22 that will be longer bristles 14 (FIG. 1) in the final product (as shown in FIGS. 8A–C), and the stationary clamping device 59 is biased to clamp the ropes 22 that have been advanced to the bottom of the shallow holes (step 134, FIG. 3A). The feeding device 30 then moves downward a distance D2, thereby advancing the rest of the ropes 22 to the bottom 79 of the deeper blind holes 86 in the moldbar 28 (FIG. 17B) (step 136, FIG. 3A).

The stationary clamping device 59 then clamps all the ropes 22 and feeding devices 30 unclamp all the ropes 22 (step 138, FIG. 3A). The feeding devices 30 are then moved upward approximately 0.10 inches (step 140, FIG. 3B). The feeding devices 30 then clamp all the ropes 22 and the stationary clamping device 59 unclamps all the ropes 22 (step 142 FIG. 3B). The feeding devices 30 and the moldbar 28 simultaneously move downward approximately 0.10 inches (step 144, FIG. 3B).

The stationary clamping device 59 is biased then to clamp all of the ropes 22 and the bristles are cut from the ropes 22 by a blade 70, discussed in detail below (step 146, FIG. 3B). The blade 70 cuts the ropes 22 flush with the bottom of the manifold 66. Next, the piston 34 of the feeding device 30 is biased to unclamp all the ropes 22 (FIGS. 7A–C) and the stationary clamping device 59 is biased to clamp all the ropes 22. The feeding device 30 moves upwards along the ropes 22 to give the feeding devices 30 about ½ inch slack to feed the ropes 22 during the next cycle (FIG. 14) (step 148, FIG. 3B). If the moldbar 28 is not completely full (step 150, FIG. 3B), the moldbar 28 is then advanced to allow a new, empty section to be aligned with the guideways 50 of the manifold 60 (step 152, FIG. 3B), and the process described above is repeated. If the moldbar 28 is completely full of bristles, the moldbar 28 is removed and a new moldbar is inserted into the tufting machine 20 (step 150, FIG. 3B).

It should be understood that the steps described above are the same for both feeding devices 30, when two are used as shown in FIG. 4 and that the two feeding devices generally perform the steps simultaneously. Also, only a single stationary clamping device 59 is needed to cooperate with two feeding devices 30.

Cutting the Filaments to Bristle Length

Figure 20:
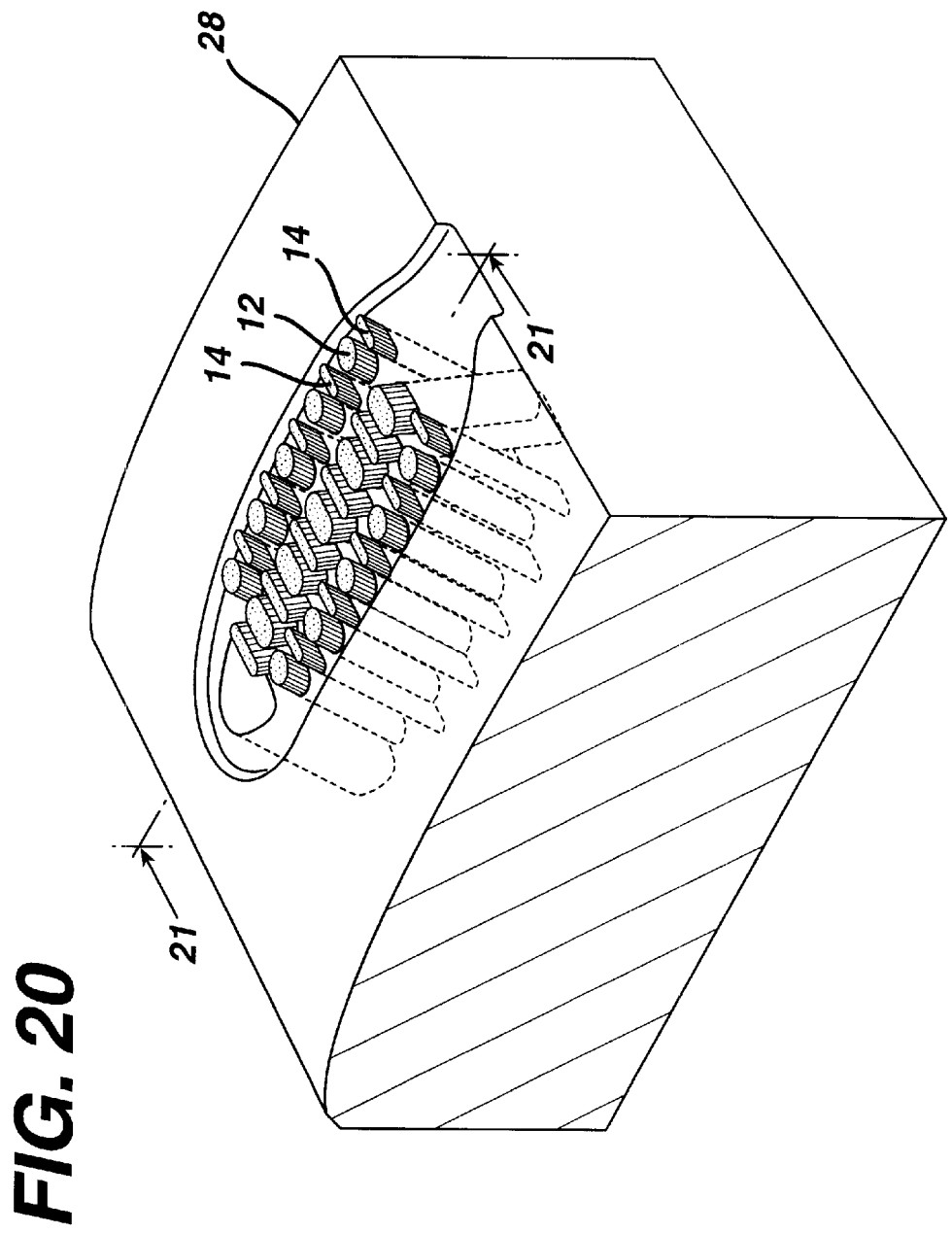
FIG. 20 is a perspective view of the moldbar of FIG. 19 with the blade disengaged and the bristles cut.
Figure 21:
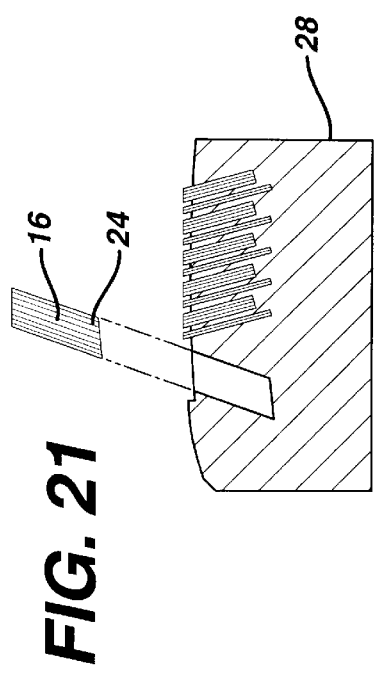
FIG. 21 is a side cut-away view of the moldbar of FIG. 12 showing the bristles within the moldbar and a toe-tuft being inserted.

Referring to FIGS. 18–20, the ropes 22 pass out of the guideways 51 in the manifold 60 and into the moldbar 28. A blade 70 is movably mounted on the bottom of the manifold 66, and can move from a position out of engagement to a position into engagement with the ropes 22 that pass out of the guideways 51 in the manifold 60.

The tufts 12, 14 are cut from the ropes 22 by blade 70. The moldbar 28 and the feeding devices 30 simultaneously move downward approximately 0.10 inches to allow the blade 70 to pass freely between the moldbar 28 and the bottom of the manifold 66, as well as allowing the finished tufts in the moldbar 28 to protrude above the top surface 76 of the moldbar 28. The stationary clamping device 59 is biased to clamp all the ropes 22. The blade 70 engages, cutting the ropes 22 flush with the bottom of the manifold 66, and then disengages, allowing the moldbar 28 to be indexed and new ropes 22 to be inserted. The ends protruding from the moldbar 28 are anchored into the toothbrush 10 when the toothbrush handle 18 is injection molded around them. The free ends 24 within the moldbar 28 become the working ends of the bristles in the finished toothbrush 10 (FIG. 1).

Repeating the Tufting Process

After the tufts 12, 14, 16 have been cut to length, as discussed above, the moldbar 28 is indexed to align an empty section of the moldbar 28 with the guideways 51 in the manifold 60. The above process is continued until all the moldbar 28 sections have been loaded with bristles. The moldbar 28 is then removed from the tufting machine 20, and replaced with a new moldbar 28.

Figure 23:
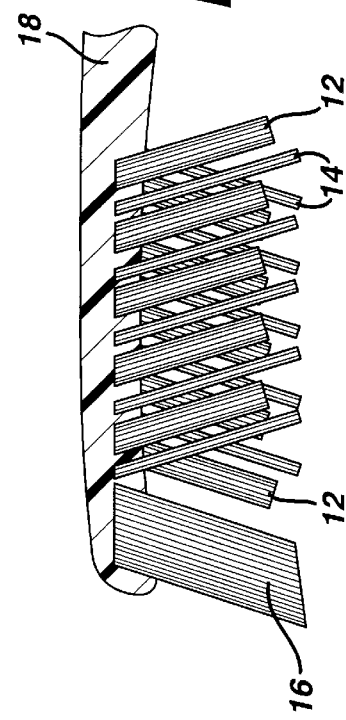
FIG. 23 is a side cut-away view of the toothbrush of FIG. 1.

Once the moldbar is completely filled, the moldbar 28 is transferred to an injection-molding machine (step 156, FIG. 3B), where it defines part of a mold cavity 80, as shown in FIG. 22. Before going to the injection-molding machine, the tufts could be fused together by a heating step, which also produces an anchor to be formed on the ends of the bristles, as is well known in the art. Resin is injected into the mold cavity 80 and a handle 18 is formed around the portions of tufts 12, 14, 16 that extend into the mold cavity 80, anchoring the bristles firmly within the handle 18 (FIG. 23) (step 158, FIG. 3B). The finished toothbrush 10 is then sent to a packaging station (step 160, FIG. 3B).

The Tensioning Device

Referring to FIGS. 24A and 24B, one problem may occur between the spools 26 and the tufting machine 20. Since the ropes 22 are advanced at different lengths, the slack between the spools 26 and tufting machine 20 will vary from one rope 22 to the next and the variation will increase with each cycle of the tufting machine 20. Eventually, the slack will cause a loop 88 in the ropes 22 (FIG. 24A) that will move out of plane and turn on itself (FIG. 24B), eventually causing a snag or break. Putting each rope 22 through a separate tension device would typically be expensive and difficult to thread. Further, individual tension devices could have a problem compensating for the increasingly varied lengths.

To provide uniform tensioning, the present invention utilizes a tensioning device 90, shown in FIG. 25. The ropes 22 are threaded between two parallel plates 92 and 94 through guides 96 and 96A. Guides 96 and 96A are generally substantially colinear. The two parallel plates 92, 94 are preferably made of a transparent material, such as glass or polycarbonate, to allow the operator to observe the ropes 22 within the tensioning device 90. The parallel plates 92, 94 are spaced so as to allow the ropes 22 to move towards the tufting machine 20, while reducing the tendency of the ropes to move out of plane and flip on themselves. Generally, the spacing of the plates is from about 2 to 5 mm.

Side walls 98 and 98A connect the two parallel plates 92, 94, and can either run the entire height of the parallel plates, as shown in FIG. 25, or for a portion of the height of the parallel plates 92, 94. Side walls 98 and 98A are typically rubber gaskets, which both space and connect the parallel plates 92, 94. The guides 96, 96A are holes within the side walls 98, 98A, located generally toward the top of the parallel plates 92, 94.

A top wall 99 and a bottom wall 99A also connect the parallel plates. The top wall 99 and bottom wall 99A may be as long as the parallel plates 92, 94, as shown in FIG. 25, or a portion of the length. Top wall 99 and bottom wall 99A are typically rubber gaskets, which both space and connect the parallel plates 92, 94. The top wall 99 will have one or a series of openings through which a fluid 95, e.g., compressed air or water, is passed. The fluid 95 will pass over the ropes 22, keeping tension on each individual rope 22 independent of the rope's length. The fluid 95 will then pass through openings (not shown) in the bottom wall 99A, or around the bottom wall 99A if the bottom wall is of a length less than the entire length of the parallel plates 92, 94. Generally, the fluid should flow in a direction substantially perpendicular to a line drawn between guides 96 and 96A, preferably within ±5 degrees of perpendicular. A flow rate of about 500 cfm can be used for typical filaments, but other flow rates may be required depending on the filaments, the size of the rope or the spacing between the parallel plates.

The tensioning device 90 is an easy and effective way to keep tension on each rope 22 and thereby prevent snagging. If hot water is used as the fluid 95, the tensioning device can also serve the function of annealing the filaments if they have not yet been annealed during manufacturing. Further, the tensioning device can be used to anneal the filaments as they are extruded and wound onto a spool by placing the tensioning device between the extruder and spool winder.

Other embodiments are within the scope of the following claims. For example, the methods and devices of the invention are also suitable for manufacturing toothbrushes having tufts that are perpendicular to the toothbrush head and/or of the same length. Further, the methods and devices described could be used to form other types of brushes, not just tooth brushes. Moreover, while the ropes have been described as being fed from spools, the ropes could be fed to the tufting machine in any desired manner.

In another embodiment, the moldbar could be manufactured with clamping holes, which would not require blind holes as described above. The ropes could be advanced to the desired depth and then clamped in place. Also, the end-rounding step could be accomplished last, after the brush has been otherwise completed.

Further, the ropes can be advanced straight through the manifold and bent into angled holes in the manifold. For example, in some situations the guideways in the manifold could interfere with each other, and the guideways would have to be straight, or at least not aligned with angled holes in the manifold. In such a situation, the ropes could be fed towards the moldbar and then bent to follow into the moldbar. Also, the ropes could be fed to multiple depths, not just two different depths. For example, using the selectivity of the feeding device, ropes could be advanced to three or more different depths.

In another embodiment, the selective feeding device could include a relief groove in the piston when ropes of different diameters are fed through. Thicker ropes would be more compliant and therefore would require more force to clamp them in place. However, the thinner ropes would be less compliant and could be sheared by the force required to hold the thicker ropes. A relief groove could be cut at the top and bottom of the guideways in the piston that guide the thinner ropes, thereby preventing shearing of the thinner ropes.

What is claimed is:

1. A method for manufacturing a toothbrush comprising:
   (a) feeding each free end of a plurality of long, continuous strands of filaments into corresponding holes in a moldbar;
   (b) selectively clamping one or more of the strands with a single selective clamping device while advancing the selected strands;
   (c) cutting the strands of filaments so that an anchoring portion of each cut strand extends above a surface of the moldbar;
   (d) placing the moldbar in a molding machine so that the anchoring portion of the filaments extends into a molding cavity defined in part by the moldbar, the molding cavity being shaped to form the body of the toothbrush; and
   (e) delivering resin to the molding cavity to form a toothbrush body around the anchoring portion.

2. The method of claim 1 wherein the holes in the moldbar are blind holes, the strands being advanced until the free ends are adjacent bottom surfaces of the blind holes.

3. The method of claim 2 wherein at least some of the blind holes having different depths.

4. The method of claim 2 wherein at least some of said blind holes are constructed to extend at an angle relative to a top surface of the moldbar.

5. The method of claim 4 wherein at least some of the blind holes are constructed to extend at different angles from others.

6. A The method of claim 1 further comprising end rounding the free ends prior to inserting the free ends into the holes.

7. The method of claim 1 wherein the dimensions of each strand correspond to predetermined dimensions of a tuft of bristles on the toothbrush.

8. The method of claim 7 wherein each strand fits sufficiently tightly in the corresponding holes so that resin is hindered from flowing into the opening when resin is delivered to the mold.

9. The method of claim 1 further comprising unwinding the plurality of strands from a single spool.

10. The method of claim 1 or 9 further comprising tensioning the strands so that the strands are under substantially uniform tension during feeding.

11. The method of 10 wherein the tensioning step comprises feeding the strands through a chamber in which a compressed gas is blown over the strands.

12. The method of claim 11 wherein the compressed gas is compressed air.

13. The method of claim 1 wherein said delivering step comprises injection molding.

14. A method for manufacturing a toothbrush comprising:
   (a) feeding each free end of a plurality of long, continuous strands of filaments into a corresponding blind hole in a moldbar, at least some of the blind holes extending into the moldbar at different angles with respect to a top surface of the moldbar;
   (b) selectively clamping on or more of the strands while advancing the selected strands;
   (c) cutting the strands of filaments so that an anchoring portion of each cut strand extends above a surface of the moldbar;
   (d) placing the moldbar in a molding machine so that the anchoring portion of the filaments extends into a molding cavity defined in part by the moldbar, the molding cavity being shaped to form the body of the toothbrush; and
   (e) delivering resin to the molding cavity to form a toothbrush body around the anchoring portion.

15. The method of claim 14 further comprising end rounding the free ends prior to inserting the free ends into the blind holes.

16. The method of claim 14 further comprising unwinding the plurality of strands from a single spool.

17. The method of claim 14 or 16 further comprising tensioning the strands so that the strands are under substantially uniform tension during feeding.

18. The method of claim 17 wherein the tensioning step comprises feeding the strands through a chamber in which a compressed gas is blown over the strands.

19. The method of claim 17 wherein the tensioning step comprises feeding the strands through a chamber in which water is flowed over the strands.

20. The method of claim 14 wherein said delivering step comprises injection molding.

* * * * *

UNITED STATES PATENT AND TRADEMARK OFFICE
CERTIFICATE OF CORRECTION

PATENT NO. : 6,578,929 B2
DATED : June 17, 2003
INVENTOR(S) : William Motherway and Joseph A. Depuydt It is certified that error appears in the above-identified patent and that said Letters Patent is hereby corrected as shown below:

<u>Title page,</u>
Item [*] Notice, replace "0 days" with -- 56 days --.

<u>Column 14,</u>
Line 2, replace "having" with -- have --.

Signed and Sealed this

Sixth Day of April, 2004

JON W. DUDAS
*Acting Director of the United States Patent and Trademark Office*